(12) United States Patent
Gao et al.

(10) Patent No.: US 12,206,064 B2
(45) Date of Patent: Jan. 21, 2025

(54) NANOPOROUS ULTRA-HIGH MOLECULAR WEIGHT POLYETHYLENE MEMBRANE

(71) Applicant: THE HONG KONG UNIVERSITY OF SCIENCE AND TECHNOLOGY, Hong Kong (CN)

(72) Inventors: Ping Gao, Hong Kong (CN); Tianshou Zhao, Hong Kong (CN); Runlai Li, Hong Kong (CN); Lin Zeng, Hong Kong (CN); Jin Li, Hong Kong (CN); Qiao Gu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 492 days.

(21) Appl. No.: 16/346,338

(22) PCT Filed: Nov. 15, 2017

(86) PCT No.: PCT/IB2017/001522
§ 371 (c)(1),
(2) Date: Apr. 30, 2019

(87) PCT Pub. No.: WO2018/091966
PCT Pub. Date: May 24, 2018

(65) Prior Publication Data
US 2019/0267594 A1  Aug. 29, 2019

Related U.S. Application Data

(60) Provisional application No. 62/529,334, filed on Jul. 6, 2017, provisional application No. 62/423,764, filed on Nov. 17, 2016.

(51) Int. Cl.
*H01M 10/0525* (2010.01)
*B01D 67/00* (2006.01)
(Continued)

(52) U.S. Cl.
CPC ... *H01M 10/0525* (2013.01); *B01D 67/00113* (2022.08); *B01D 69/02* (2013.01);
(Continued)

(58) Field of Classification Search
CPC .......... B01D 67/0011; B01D 67/0025; H01M 50/403; H01M 50/411; H01M 50/44; H01M 8/0239
See application file for complete search history.

(56) References Cited

U.S. PATENT DOCUMENTS 3,823,210 A   7/1974   Shii et al.
5,205,974 A   4/1993   Bastiaansen et al.
(Continued)

FOREIGN PATENT DOCUMENTS

CN   1736813 A    2/2006
CN   102637891 A   8/2012
(Continued)

OTHER PUBLICATIONS

Machine translation of JP-2017165938-A, Iatomi et al. (Year: 2017).*
(Continued)

*Primary Examiner* — Brian R Ohara
*Assistant Examiner* — Brent C Thomas
(74) *Attorney, Agent, or Firm* — SALIWANCHIK, LLOYD & EISENSCHENK

(57) ABSTRACT

Methods are provided for producing a biaxially oriented nanoporous UHMWPE membrane. The method can include combining a petroleum jelly, an ultra-high-molecular-weight polyethylene (UHMWPE), and an antioxidant, forming a suspension, feeding the suspension into an extruder to produce a gel filament, pressing the gel filament to form a gel film, subjecting the gel film to an annealing temperature, and extracting the petroleum jelly from the gel film.

34 Claims, 21 Drawing Sheets

(51) Int. Cl.

| | |
|---|---|
| B01D 69/02 | (2006.01) |
| B01D 71/26 | (2006.01) |
| H01M 8/0289 | (2016.01) |
| H01M 8/1018 | (2016.01) |
| H01M 50/403 | (2021.01) |
| H01M 50/406 | (2021.01) |
| H01M 50/414 | (2021.01) |
| H01M 50/417 | (2021.01) |
| H01M 50/44 | (2021.01) |
| H01M 50/489 | (2021.01) |
| H01M 50/491 | (2021.01) |
| H01M 50/494 | (2021.01) |
| B82Y 30/00 | (2011.01) |
| B82Y 40/00 | (2011.01) |
| H01M 4/131 | (2010.01) |
| H01M 4/134 | (2010.01) |

(52) U.S. Cl.
CPC ........ *B01D 71/261* (2022.08); *H01M 8/0289* (2013.01); *H01M 8/1018* (2013.01); *H01M 50/403* (2021.01); *H01M 50/406* (2021.01); *H01M 50/414* (2021.01); *H01M 50/417* (2021.01); *H01M 50/44* (2021.01); *H01M 50/489* (2021.01); *H01M 50/491* (2021.01); *H01M 50/494* (2021.01); *B01D 2325/04* (2013.01); *B01D 2325/22* (2013.01); *B01D 2325/24* (2013.01); *B82Y 30/00* (2013.01); *B82Y 40/00* (2013.01); *H01M 4/131* (2013.01); *H01M 4/134* (2013.01); *H01M 2300/004* (2013.01)

(56) References Cited

U.S. PATENT DOCUMENTS

| | | | |
|---|---|---|---|
| 6,475,666 B1 | 11/2002 | Takeuchi | |
| 6,749,961 B1 | 6/2004 | Nguyen et al. | |
| 8,795,565 B2 | 8/2014 | Wei et al. | |
| 8,945,753 B2 | 2/2015 | Chen et al. | |
| 8,951,456 B2 | 2/2015 | Uehara et al. | |
| 9,225,036 B2 | 12/2015 | Chang et al. | |
| 9,246,199 B2 | 1/2016 | Wang et al. | |
| 2003/0054232 A1* | 3/2003 | Zucker | H01M 50/466 429/144 |
| 2003/0124279 A1 | 7/2003 | Sridharan et al. | |
| 2010/0230351 A1* | 9/2010 | Hoving | B01D 69/02 427/532 |
| 2010/0316902 A1* | 12/2010 | Takita | H01M 10/0525 429/129 |
| 2011/0223486 A1 | 9/2011 | Zhang et al. | |
| 2011/0241245 A1 | 10/2011 | Hiltner et al. | |
| 2012/0145468 A1* | 6/2012 | Pekala | H01M 10/52 429/251 |
| 2013/0095353 A1 | 4/2013 | Li et al. | |
| 2013/0157035 A1* | 6/2013 | Uehara | B29D 7/01 521/143 |
| 2015/0056399 A1 | 2/2015 | Takeoka et al. | |
| 2015/0079450 A1 | 3/2015 | Wensley et al. | |
| 2016/0204459 A1 | 7/2016 | Henkensmeier et al. | |

FOREIGN PATENT DOCUMENTS

| | | | |
|---|---|---|---|
| CN | 103943874 A | 7/2014 | |
| CN | 105237856 A | 1/2016 | |
| CN | 107415270 A | 12/2017 | |
| EP | 2 891 677 A1 | 7/2015 | |
| JP | 11-60790 A | 3/1999 | |
| JP | 2017165938 A * | 9/2017 | |
| WO | WO-8602656 A1 * | 5/1986 | C08J 9/28 |

OTHER PUBLICATIONS

Wang, Q. et al., "Thermal runaway caused fire and explosion of lithium ion battery," *Journal of Power Sources*, 2012, 208:210-224, Elsevier B.V.

Balakrishnan, P. G. et al., "Safety mechanisms in lithium-ion batteries," *Journal of Power Sources*, 2006, 155:401-414, Elsevier B.V.

Zhang, S. S., "A review on the separators of liquid electrolyte Li-ion batteries," *Journal of Power Sources*, 2007, 164:351-364, Elsevier B.V.

Ozawa, K., "Lithium-ion rechargeable batteries with $LiCoO_2$ and carbon electrodes: the $LiCoO_2$/C system," *Solid State Ionics*, 1994, 69:212-221, Elsevier Science B.V.

Laman, F. C. et al., "Impedance Studies for Separators in Rechargeable Lithium Batteries," *J. Electrochem. Soc.*, Apr. 1993, 140(4):L51-L53, The Electrochemical Society, Inc.

Ilic, D. et al., "PoLiFlex™, the innovative lithium-polymer battery," *Journal of Power Sources*, 2004, 129:34-37, 2003 Elsevier B.V.

Schmidt-Rohr, K. et al., "Parallel cylindrical water nanochannels in Nafion fuel-cell membranes," *nature materials*, Jan. 2008, 7:75-83, Nature Publishing Group.

Costamagna, P. et al., "Quantum jumps in the PEMFC science and technology from the 1960s to the year 2000 Part I. Fundamental scientific aspects☆," *Journal of Power Sources*, 2001, 102:242-252, Elsevier Science B.V.

Arcella, V. et al., "High Performance Perfluoropolymer Films and Membranes," *Ann. N. Y. Acad. Sci.*, 2003, 984:226-244, New York Academy of Sciences.

Hsu, W. Y. et al., "Ion Transport and Clustering in Nafion* Perfluorinated Membranes**," *Journal of Membrane Science*, 1983, 13:307-326, Elsevier Science Publishers B.V., Amsterdam.

Kreuer, K. D., "On the development of proton conducting polymer membranes for hydrogen and methanol fuel cells," *Journal of Membrane Science*, 2001, 185:29-39, Elsevier Science B.V.

Choi, P. et al., "Thermodynamics and Proton Transport in Nafion II. Proton Diffusion Mechanisms and Conductivity," *Journal of The Electrochemical Society*, 2005, 152(3):E123-E130, The Electrochemical Society, Inc.

Rodgers, M. P. et al., "The effect of spatial confinement of Nafion® in porous membranes on macroscopic properties of the membrane," *Journal of Membrane Science*, 2008, 321:100-113, Elsevier B.V.

Gierke, T. D. et al., "The Morphology in Nafion* Perfluorinated Membrane Products, as Determined by Wide- and Small-Angle X-Ray Studies," *Journal of Polymer Science: Polymer Physics Edition*, 1981, 19:1687-1704, John Wiley & Sons, Inc.

Lin, J. et al., "Properties of Water in Prestretched Recast Nafion," *Macromolecules*, 2008, 41:4284-4289, American Chemical Society.

Li, C. et al., "Casting Nafion-sulfonated organosilica nanocomposite membranes used in direct methanol fuel cells," *Journal of Membrane Science*, 2006, 272:50-57, 2005 Elsevier B.V.

Byun, S. C. et al., "Effect of solvent and crystal size on the selectivity of ZSM-5/Nafion composite membranes fabricated by solution-casting method," 2006, 177:3233-3243, Elsevier B.V.

Miyake, N. et al., "Evaluation of a Sol-Gel Derived Nafion/Silica Hybrid Membrane for Polymer Electrolyte Membrane Fuel Cell Applications: II. Methanol Uptake and Methanol Permeability," *Journal of The Electrochemical Society*, 2001, 148(8):A905-A909, ECS—The Electrochemical Society.

Bauer, F. et al., "Influence of Temperature and Humidity on the Mechanical Properties of Nafion® 117 Polymer Electrolyte Membrane," *Journal of Polymer Science: Part B: Polymer Physics*, 2005, 43:786-795, Wiley Periodicals, Inc.

Tang, Y. et al., "An experimental investigation of humidity and temperature effects on the mechanical properties of perfluorosulfonic acid membrane," *Materials Science and Engineering A*, 2006, 425:297-304, Elsevier B.V.

Falk, M., "An infrared study of water in perfluorosulfonate (Nafion) membranes," *Can. J. Chem.*, 1980, 58:1495-1501, National Research Council of Canada.

Weber, A. Z. et al., "Transport in Polymer-Electrolyte Membranes I. Physical Model," *Journal of The Electrochemical Society*, 2003, 150(7):A1008-A1015, The Electrochemical Society, Inc.

(56) References Cited

OTHER PUBLICATIONS

Sahu, A. K. et al., "Nafion and modified-Nafion membranes for polymer electrolyte fuel cells: An overview," *Bull. Mater. Sci.*, Jun. 2009, 32(3):285-294, Indian Academy of Sciences.

Zhang, W. et al., "Crystallinity Enhancement of Nafion Electrolyte Membranes Assisted by a Molecular Gelator," *Langmuir*, 2011, 27:9520-9527, American Chemical Society.

Zhang, W. et al., "Exfoliated Pt-Clay/Nafion Nanocomposite Membrane for Self-Humidifying Polymer Electrolyte Fuel Cells," *Langmuir*, 2008, 24:2663-2670, American Chemical Society.

Yildirim, M. H. et al., "Dimensionally stable Nafion-polyethylene composite membranes for direct methanol fuel cell applications," *Journal of Membrane Science*, 2008, 321:364-372, Elsevier B.V.

Hasegawa, H. et al., "Stress-strain measurement of ultra-thin polystyrene films: Film thickness and molecular weight dependence of crazing stress," *Polymer*, 2017, 123:179-183, Elsevier Ltd.

International Search Report dated Mar. 28, 2018 in International Application No. PCT/IB2017/001522.

International Search Report dated Jul. 16, 2019 in International Application No. PCT/IB2018/001623.

\* cited by examiner

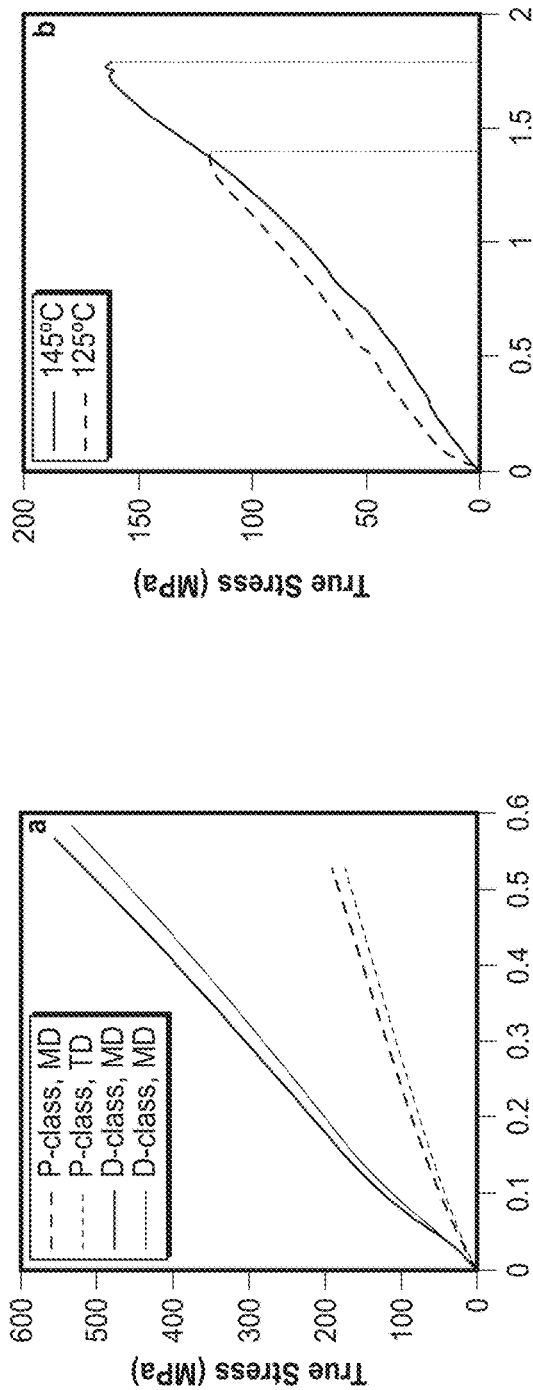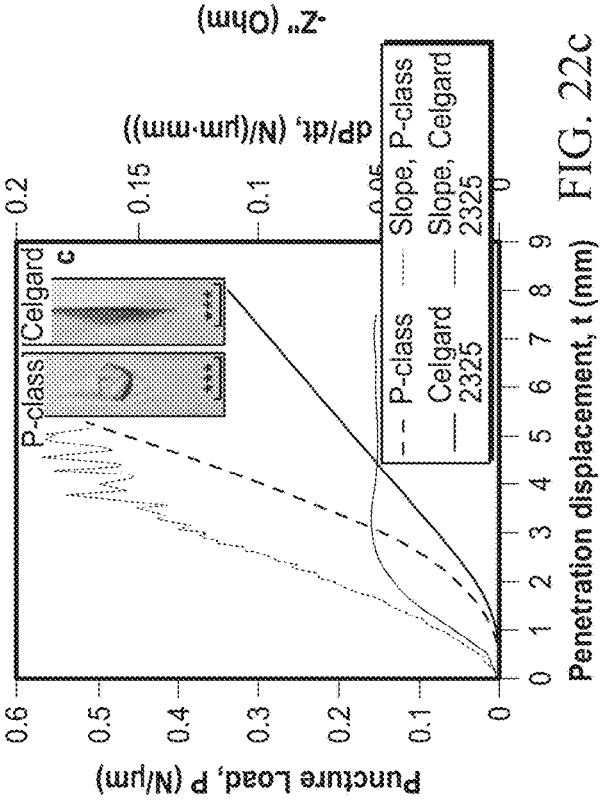
FIG. 22a  FIG. 22b  FIG. 22c  FIG. 22d

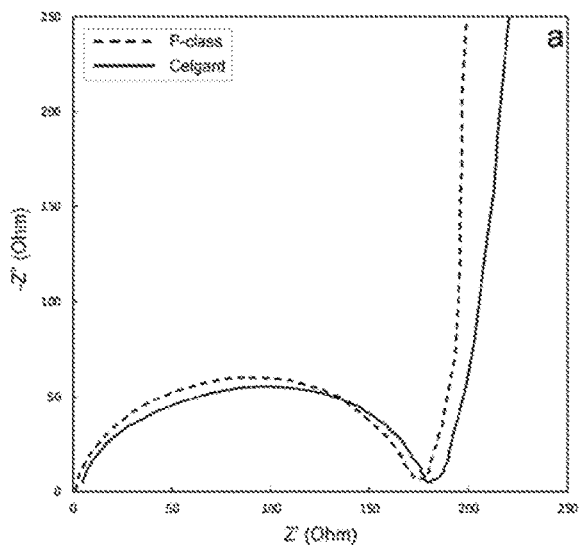
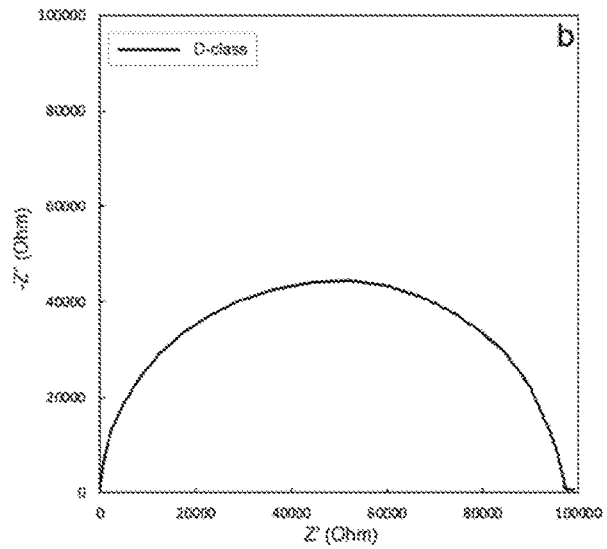
FIG. 23a          FIG.23b
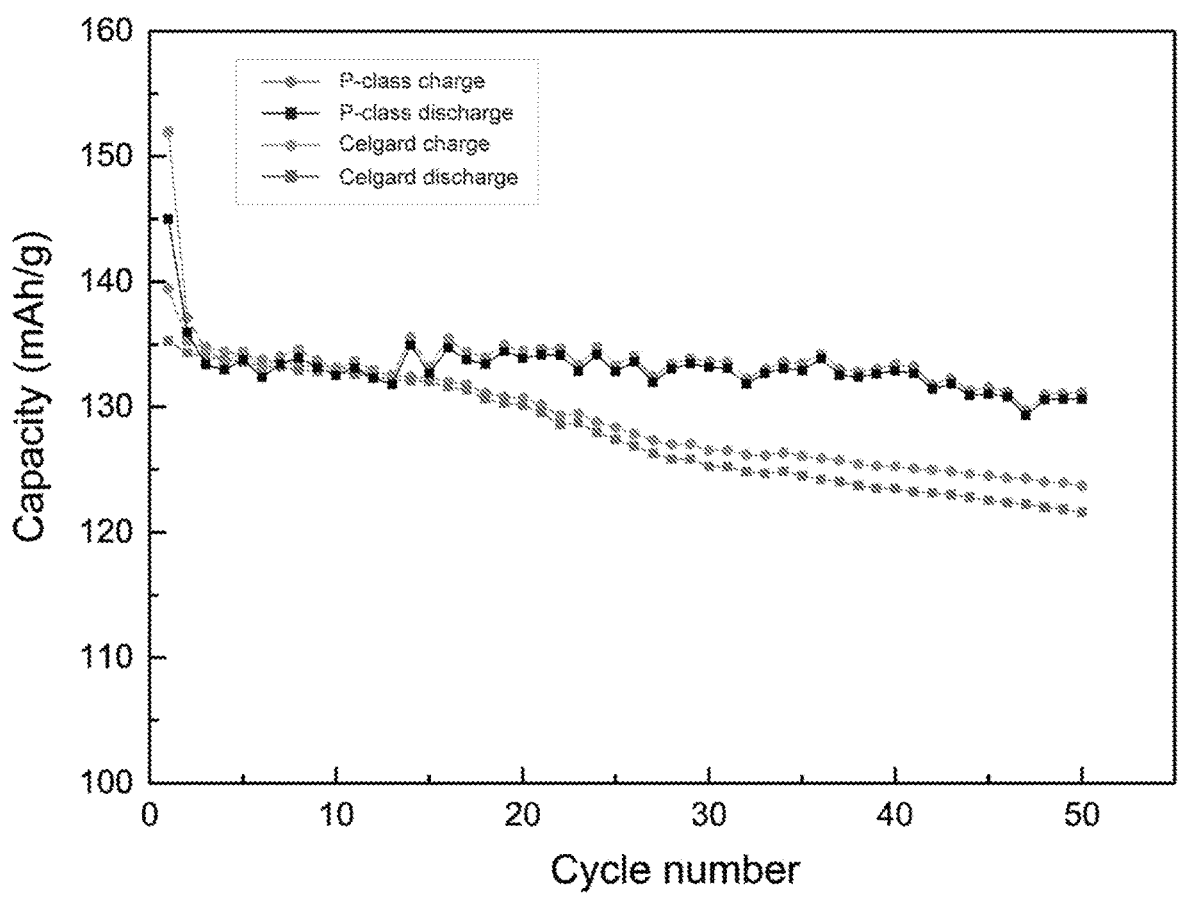
FIG.24

NANOPOROUS ULTRA-HIGH MOLECULAR WEIGHT POLYETHYLENE MEMBRANE

CROSS-REFERENCE TO RELATED APPLICATIONS

This application is the U.S. national stage application of International Patent Application No. PCT/IB2017/001522, filed Nov. 15, 2017; which claims the benefit of U.S. Provisional Patent Application Ser. Nos. 62/423,764, filed Nov. 17, 2016; and 62/529,334, filed Jul. 6, 2017; all of which are hereby incorporated by reference in their entirety, including any figures, tables, or drawings.

BACKGROUND

Lithium-ion batteries (LIB), provide numerous advantages and are essential to resolving energy shortage and environmental issues caused by fossil fuels usage. However LIB still suffers from hazard problems including fires and explosions. These problems can be caused by thermal runaway, i.e., an increase in temperature causing a further increase in temperature, mainly due to exothermal reactions out of control. Various types of safety devices, such as rupture valve, safety vents, thermal fuses pressure temperature coefficient device (PTC), and other circuit breakers were designed to enhance the reliability of LIB. Vents installed in battery systems that allow the gases and effluent to release once the pressure inside reaches a predetermined amount and a battery design mainly including a protection circuit module with temperature sensor to inhibit overheating are other example of response to LIB hazards. But inconvenience of installation, operation and replacement, cost issues and difficulties of utilization in portable-scale batteries of the conventional safety devices continue to provide roadblocks to an efficient solution to the above referenced issues.

Three main groups of separators commonly used in batteries include: (1) microporous polymer membrane, (2) non-woven fabric mats, and (3) inorganic composite membranes, and polyolefin membranes are the most widely-used one in LIB. The concept of thermal shutdown separators suggests that the micropores in the separator would be shut down by softening the material (usually high density polyethylene, HDPE) with temperature rises. HDPE materials meltdown at 135° C. and lose mechanical strength. Thus multi-layer stacking by piling PE and PP together was proposed. However, the proposal sacrifices battery performance due to higher separator thickness and resistance and increases manufacturing cost.

BRIEF SUMMARY

Embodiments of the subject invention provide an expansive single layer membrane with high porosity, high mechanical property, and high corrosion resistance with fast thermal shutdown functionality. The single layer membrane can be applied as separator in Lithium ion batteries (LIB).

Embodiments of the subject invention provide a porous membrane whose shutdown mechanism does not consist of melting down at melting temperature, which is low in mechanical strength and leaves a system vulnerable to further stimulations. Mechanical strength can be strengthened after shutdown in order to withstand further external impact. In order to accomplish the objective, the shutdown mechanism can include recrystallization and annealing, which increases mechanical strength of the porous membrane after shutting down. Embodiments of the subject invention provide a biaxial oriented UHMWPE nanoporous membrane with thermal shutdown functionality. The shutdown mechanism of the single layer membrane can be completed in seconds and the mechanical strength of the membrane is improved after shutdown process.

BRIEF DESCRIPTION OF THE DRAWINGS

FIG. 12A shows mapping results of sulfur (S), fluorine (F) and Carbon (C) superposed on SEM photograph. FIG. 12B shows an image of mapping results of fluorine (F) superposed on SEM photograph. FIG. 12C shows an image of mapping results of element Carbon (C) superposed on SEM photograph.

FIG. 22a shows a plot of true stress versus Hencky strain curves of membranes before (P-class) and after (D-class) thermal treatment. FIG. 22b shows a plot of true stress-strain curves of P-class membranes tested at 125 and 145° C. (pore-closure temperature). FIG. 22c shows a plot of force-penetration displacement curves of P-class and Celgard 2325® for puncture resistance test. The inserts are the images of the samples after puncture fracture. FIG. 22d Nyquist plots of membranes before (P-class) and after (D-class) pore closure sandwiched in between blocking electrodes.

FIG. 23a shows a Nyquist plot of P-class and Celgard 2325® trilayer membranes.

FIG. 23b shows a Nyquist plot of D-class membranes assembled in between Li and LiCoO$_2$.

FIG. 24 shows a plot of charge and discharge IC-rate capacity of cells utilizing P-class and Celgard 2325® membranes as separators.

DETAILED DESCRIPTION

Figure 1:
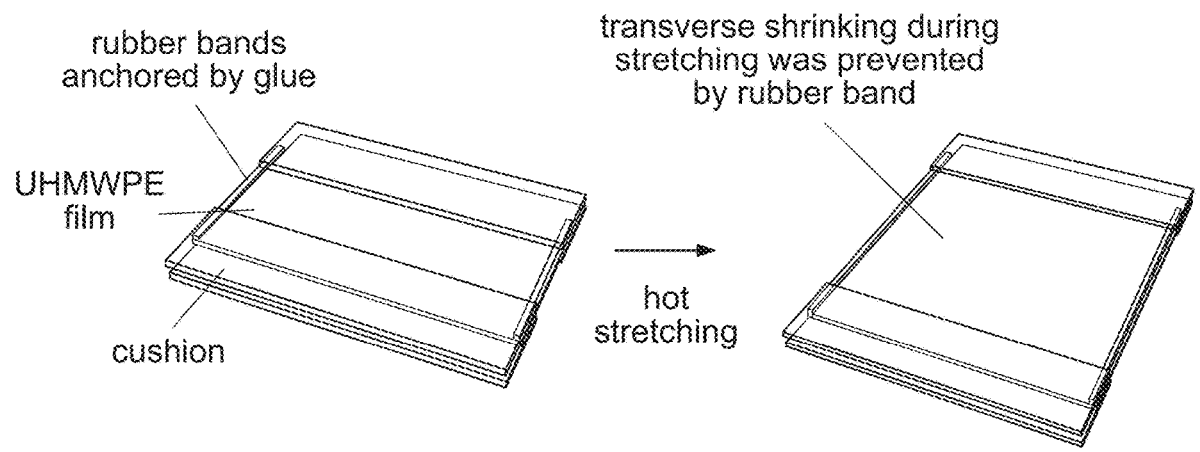
FIG. 1 shows a diagram illustrating a constraint applied on the membrane prior to hot stretching to inhibit shrinking in transverse direction.
Figure 2:
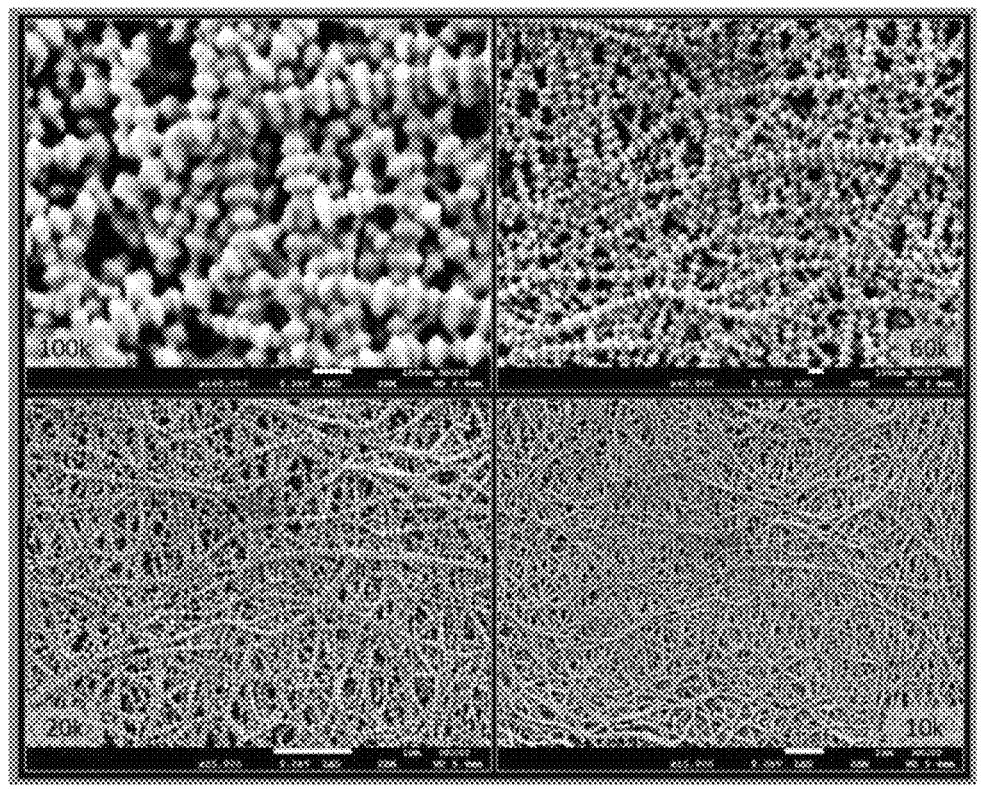
FIG. 2 shows scanning electron microscopic (SEM) images of surface morphology of UHMWPE biaxial oriented nanoporous membranes.
Figure 3:
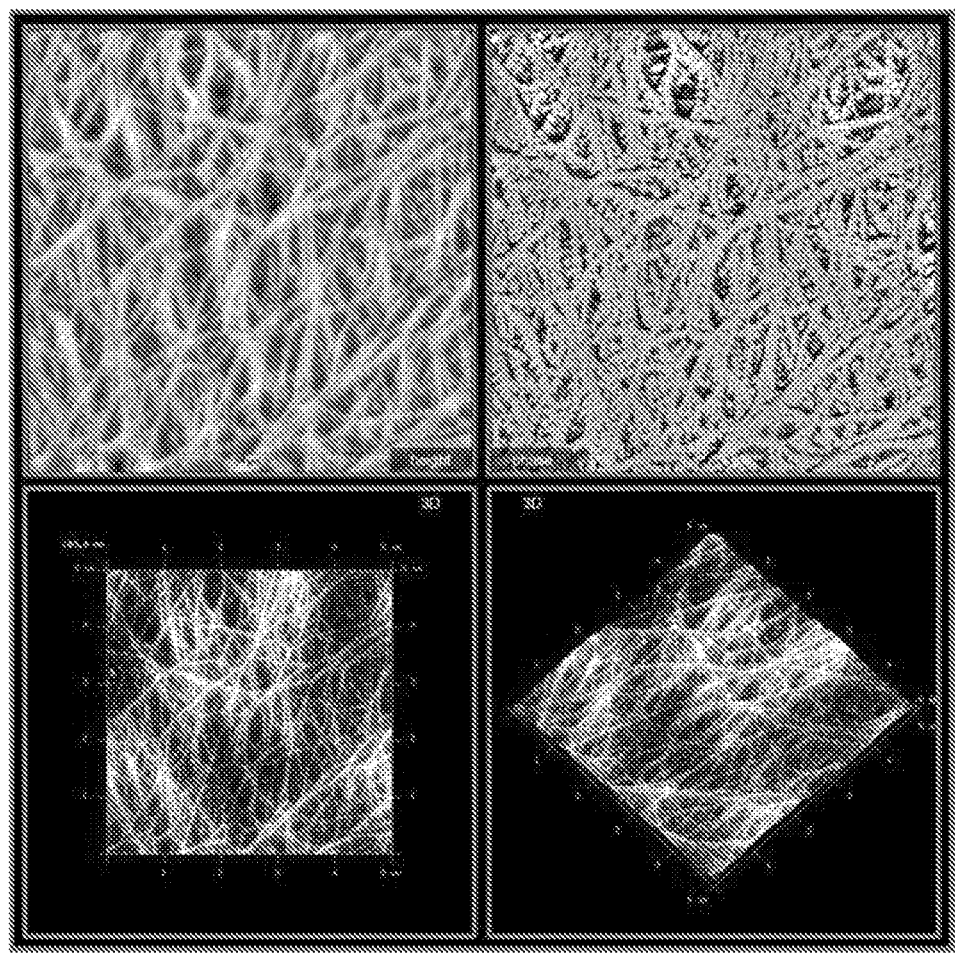
FIG. 3 shows atomic force microscopic (AFM) images of surface morphology of UHMWPE biaxial oriented nanoporous membranes.
Figure 4:
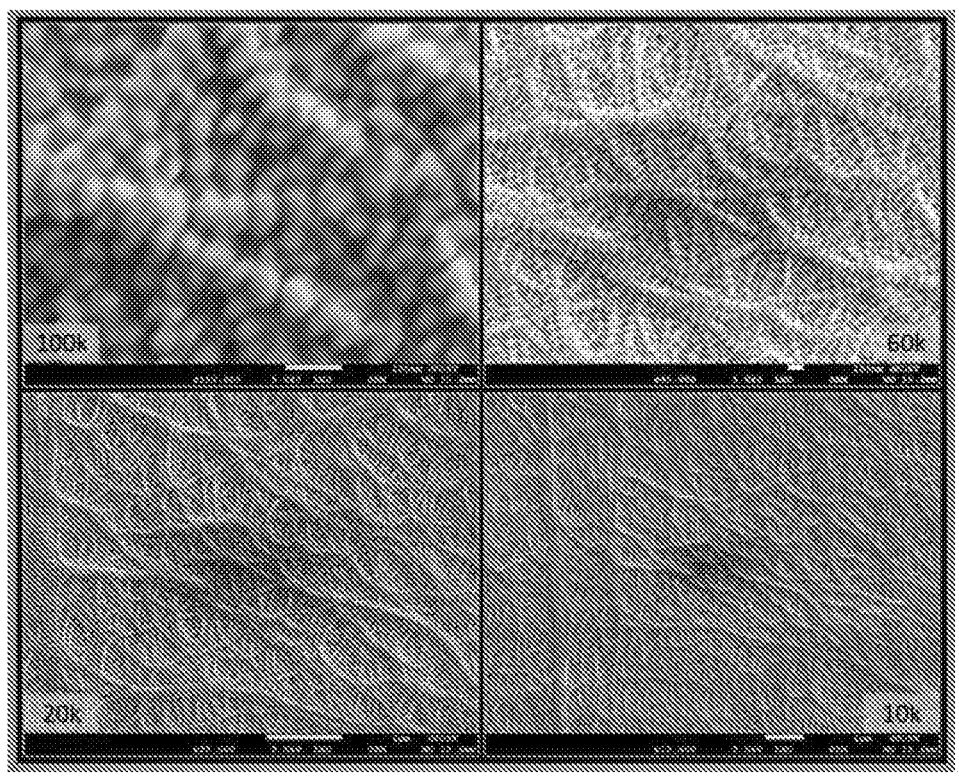
FIG. 4 shows scanning electron microscopic (SEM) images of surface morphology of UHMWPE biaxial oriented nanoporous membranes after pore-closure by thermal treatment at 145° C.
Figure 5:
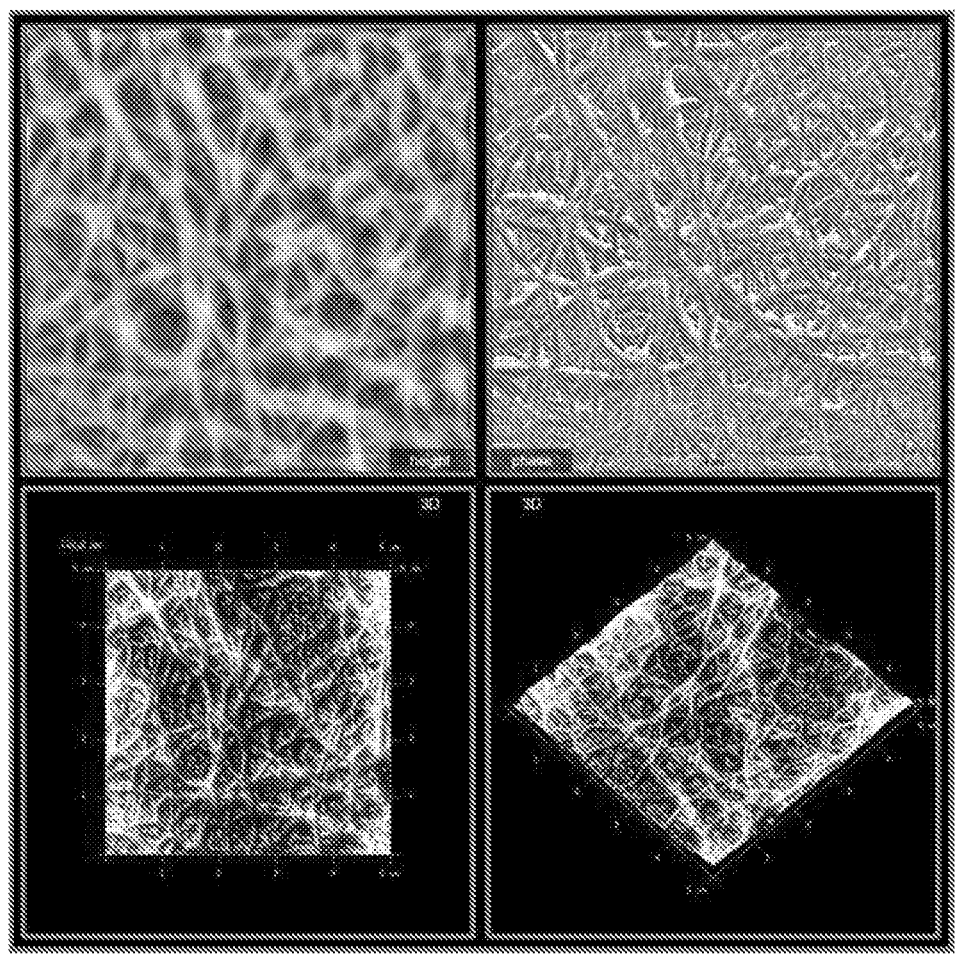
FIG. 5 shows atomic force microscopic (AFM) images of surface morphology of UHMWPE biaxial oriented nanoporous membranes after pore-closure by thermal treatment at 145° C.
Figure 6:
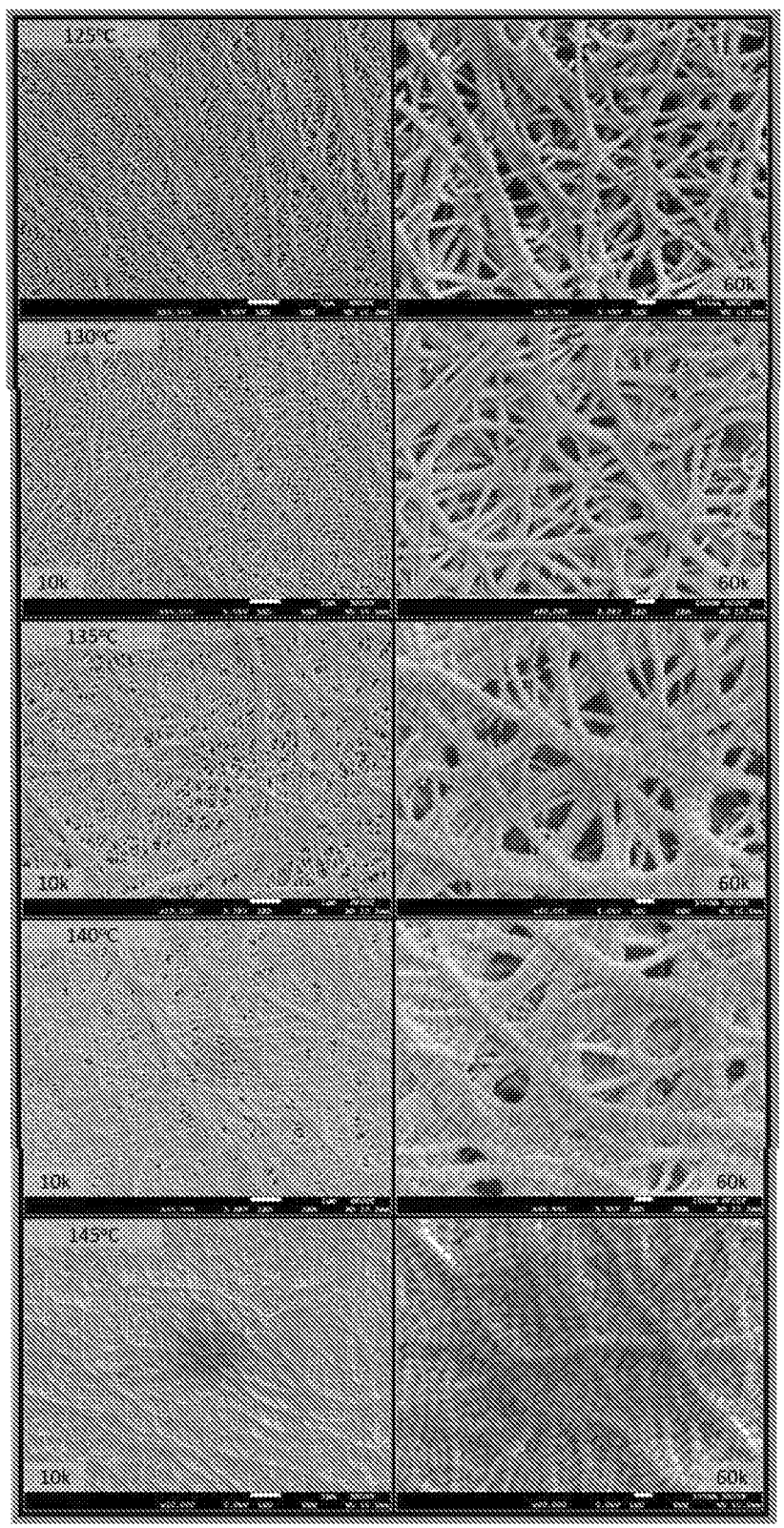
FIG. 6 shows scanning electron microscopic (SEM) images of surface morphology of UHMWPE biaxial oriented nanoporous membranes after thermal treatment at a temperature range of from 125° C. to 145° C.
Figure 7:
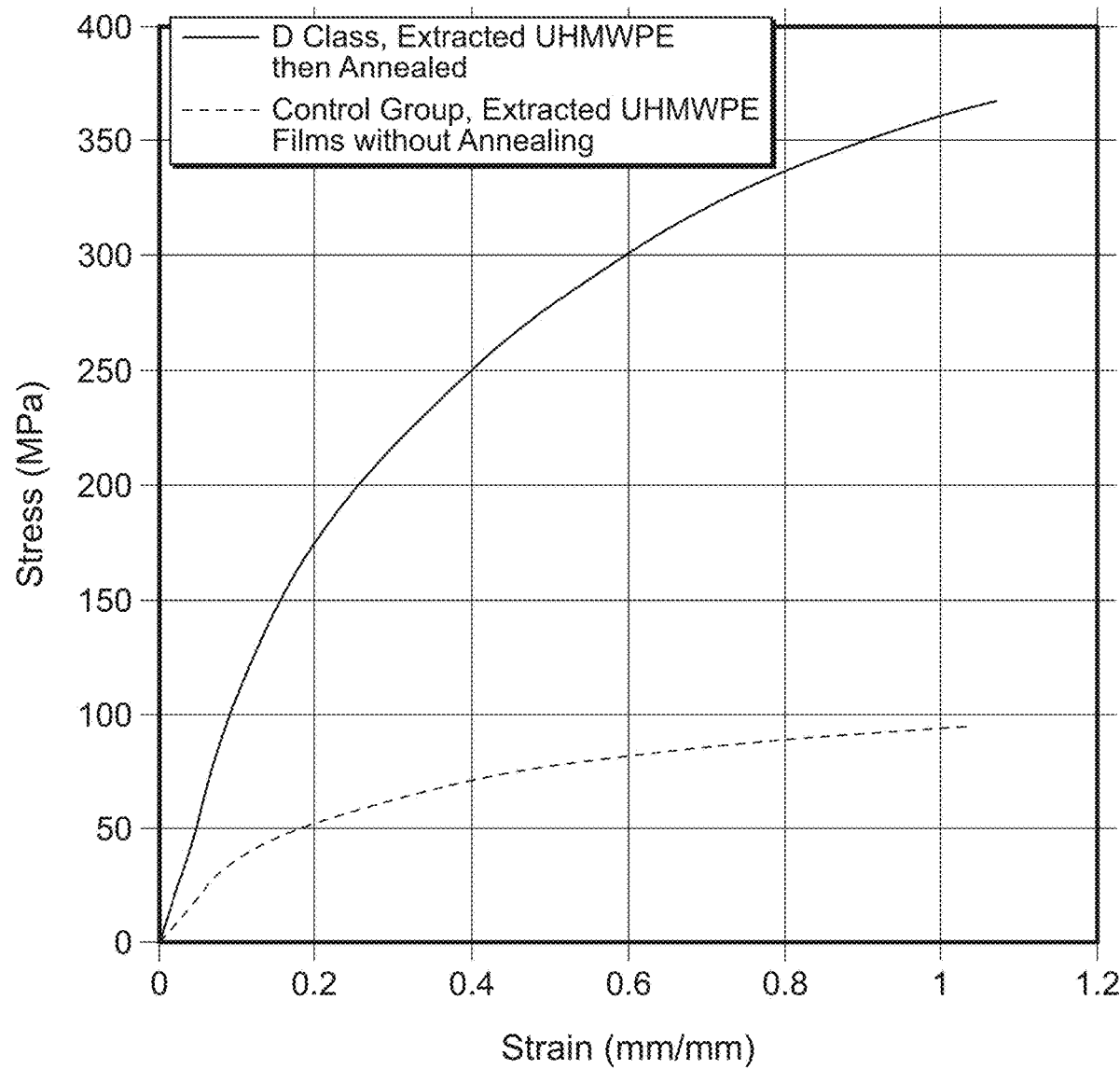
FIG. 7 shows a plot of a stress-strain curve of UHMWPE biaxial oriented nanoporous membranes before and after thermal treatment at 145° C.
Figure 8:
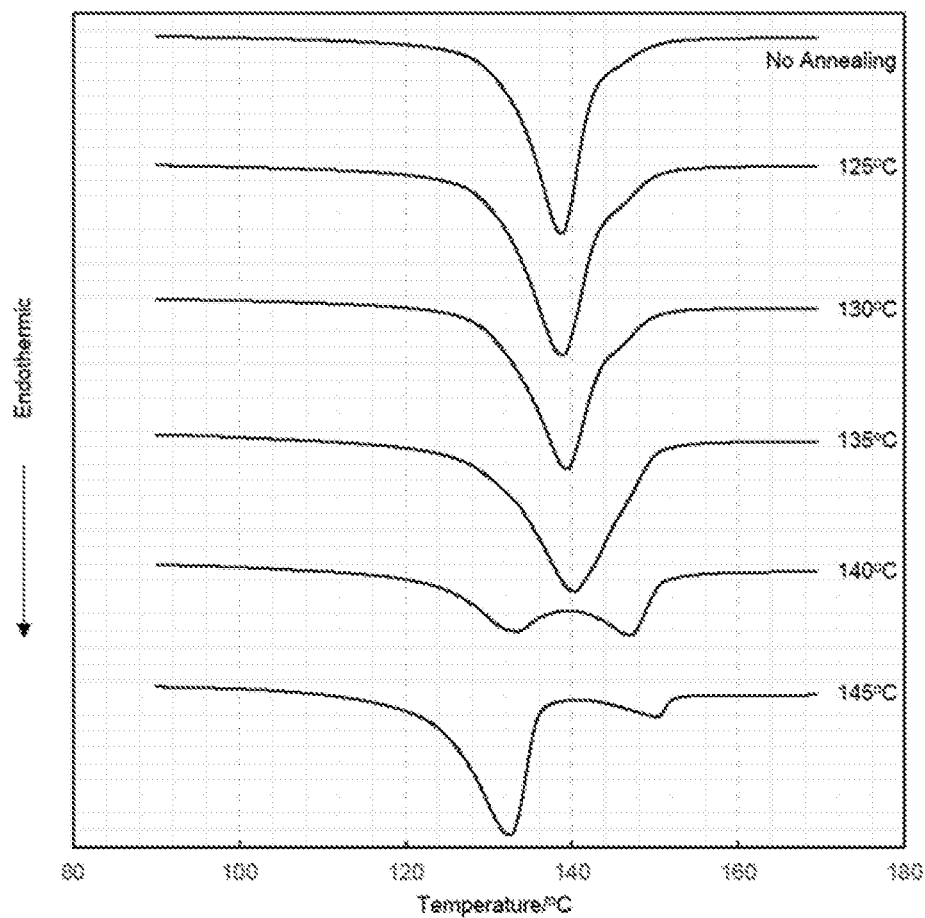
FIG. 8 shows a plot of differential scanning calorimetry (DSC) endothermic curves of UHMWPE biaxial oriented nanoporous membranes after thermal treatment at a temperature range of from 125° C. to 145° C.
Figure 9A:
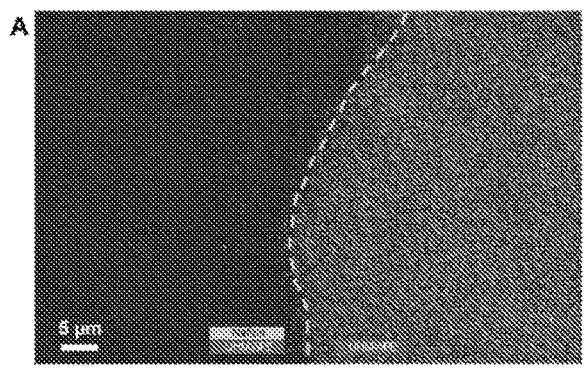
FIGS. 9A and 9B show scanning electron (SEM) images focusing on the boundary of Nafion impregnation diffusion test. The dashed line is provided to emphasize the boundary.
Figure 9B:
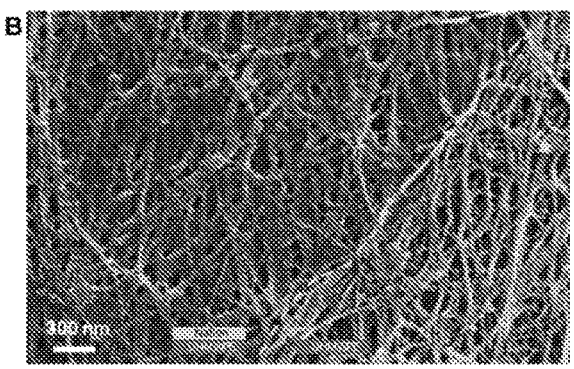
Figure 10A:
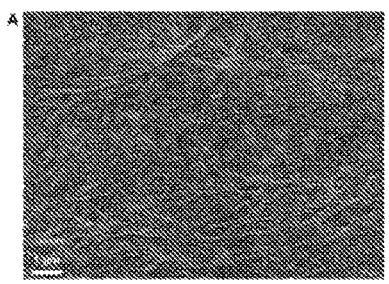
FIGS. 10A, 10B show scanning electron microscope (SEM) images of top surface morphologies of UHMWPE membranes before Nafion® impregnation.
Figure 10B:
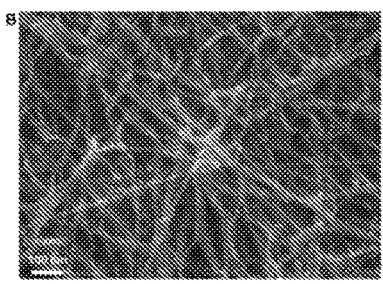
Figure 10C:
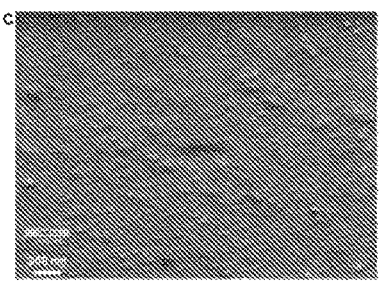
FIG. 10C shows scanning electron microscope (SEM) images of top surface morphologies of Nafion®/UHMWPE (NPE) composite membranes.
Figure 11A:
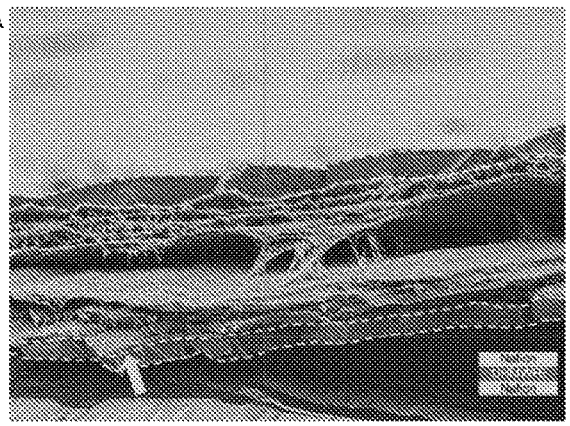
FIGS. 11A, 11B show scanning electron microscope (SEM) images of cross-sectional hierarchy structure of Nafion®/UHMWPE (NPE) composite membranes, dashed lines emphasize the extra deposited Nafion® layer, and the area highlighted by the arrow indicates the very surface layer of UHMWPE is completely mingled together with Nafion®.
Figure 11B:
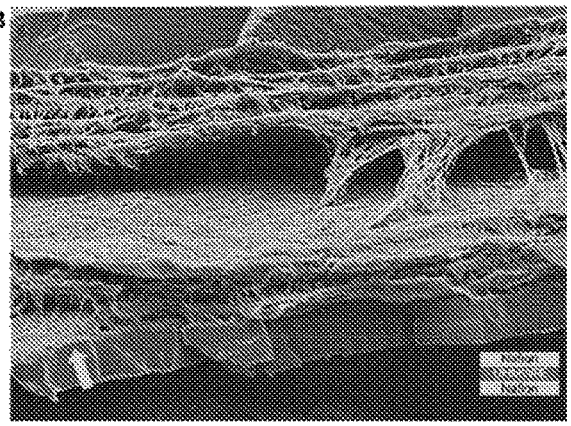
Figure 12A:
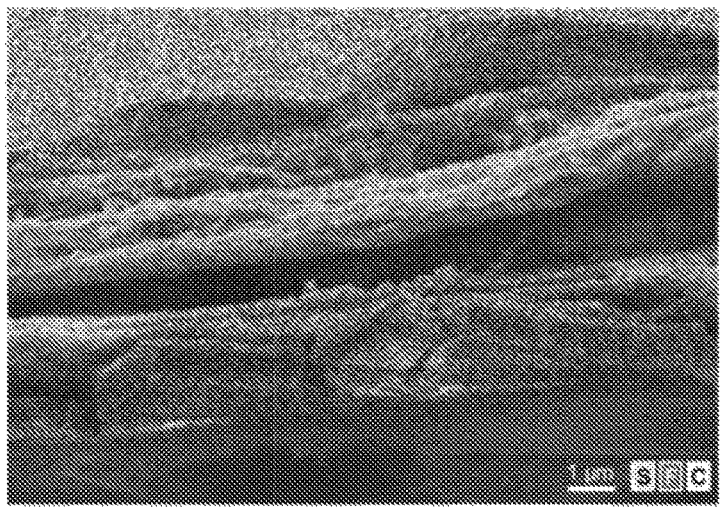
FIGS. 12A, 12B, and 12C show in situ energy-dispersive X-ray spectroscopy mapping focusing on the cross-sections of Nafion/UHMWPE composite membranes.
Figure 12B:
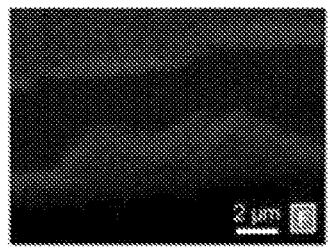
Figure 12C:
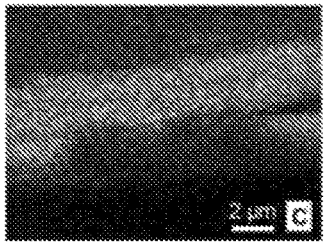
Figure 13:
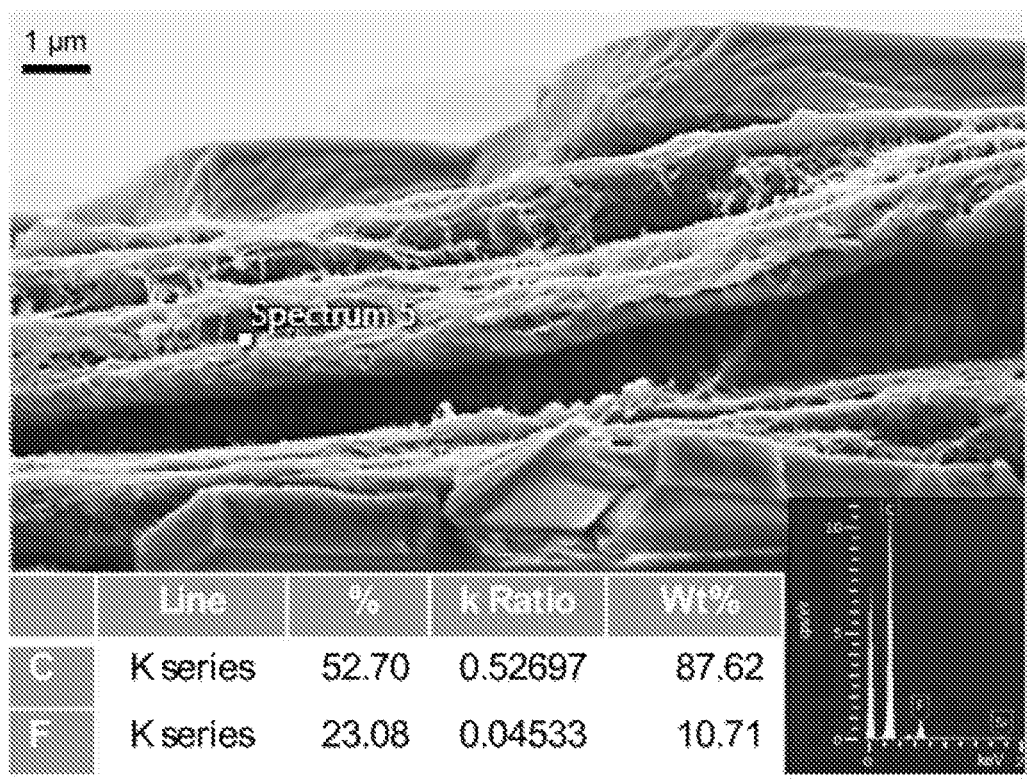
FIG. 13 shows an in situ energy-dispersive X-ray spectroscopy point sampling focusing on the cross-sections of Nafion/UHMWPE composite membranes.
Figure 14:
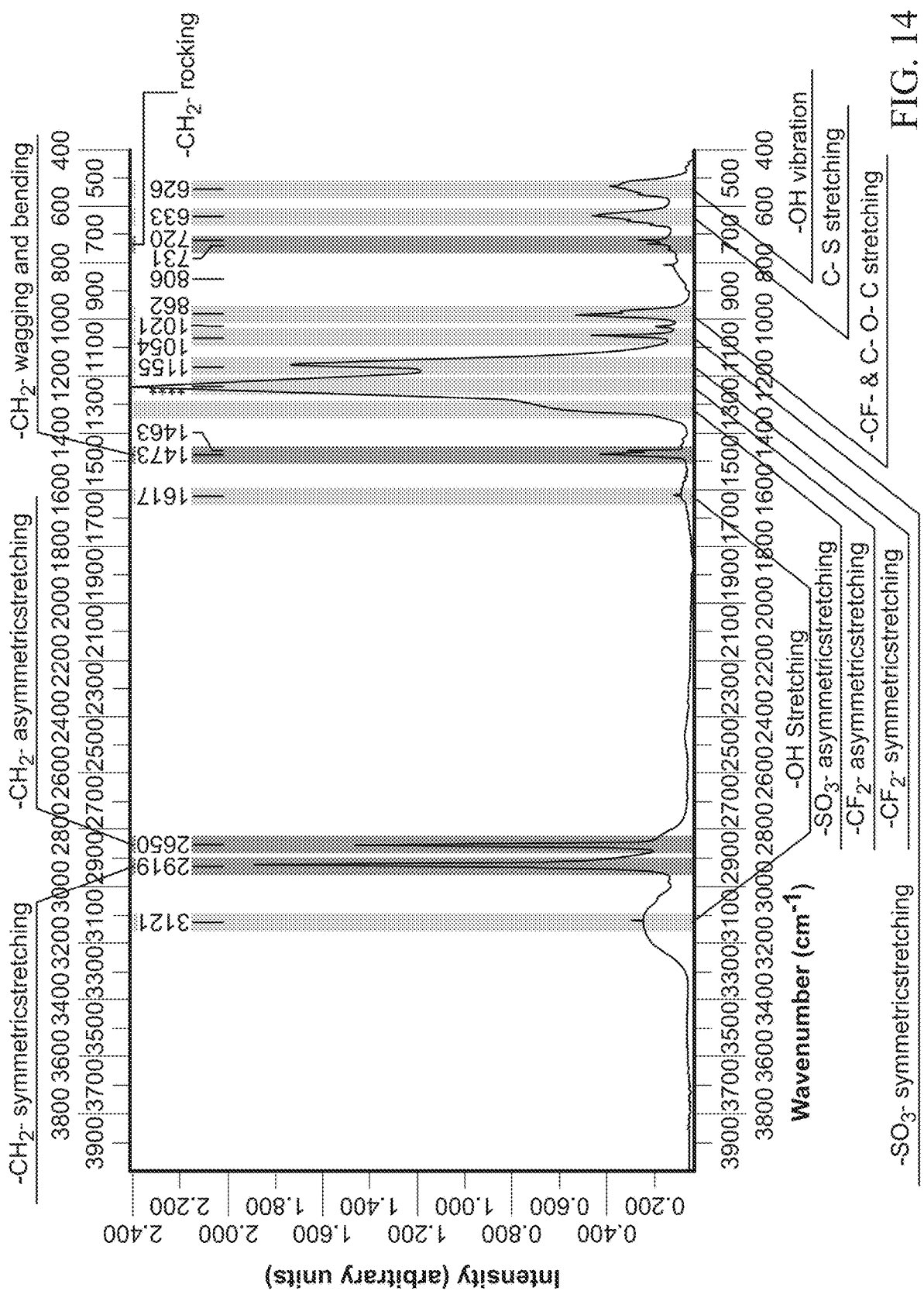
FIG. 14 shows a plot of an FTIR Absorption Spectra of Nafion®/UHMWPE composite membranes (transmission mode).

Embodiments of the subject invention provide a nanoporous ultra-high molecular weight polyethylene (UHMWPE) membrane separator which can be applied in various kinds of separation processes, including rapid pore closure with simultaneous toughening functionality, and methods for producing the same. The biaxial oriented nanoporous UHMWPE membranes can be prepared using a combination of gel spinning and sequential biaxial hot stretching, with an average equivalent pore diameter of about 35 nm and volumetric porosity over 60%. Rapid pore closure can be performed by annealing the membrane separators at 145° C. in only 7 seconds, surface pore structure will be completed shut down with a simultaneous drastic enhancement in both tensile strength (300 MPa, 200% increase) and Young's moduli (1.9 GPa, 250% increase). This nanoporous UHMWPE membrane can be applied as separators in energy conversion and storage devices, especially ideal for lithium-ion batteries (LIB) in which can function as both separator and safety device.

Embodiments of the subject invention provide methods for preparation procedure for biaxially oriented nanoporous UHMWPE membranes. Certain embodiments can increase the inter-chain distances of a UHMWPE polymer network, reduce the interaction (friction) between neighboring polymer chains, increase the mobility of polymer chains, and eventually reduce the chain entanglement density significantly. The "entanglement density" can determine the melt viscosity of polymers. High entanglement density, results in difficulty in processing a polymer. Certain embodiments can increase the degree of orientation of polymer chains, and ensure the orientation to be biaxial. Orientation of polymer chains can determine the mechanical strength, the higher orientation degree can result in better mechanical properties. Simultaneously, a biaxial orientation direction suggests that the mechanical properties are equivalent in two perpendicular directions for UHMWPE films.

Certain embodiments can improve the mechanical properties by transferring the UHMWPE crystals from relatively weaker crystals to relatively stronger crystals. There are two major kinds of crystals occurring of polyethylene during crystallization: folded chain crystals (FCC, the weaker crystals, with a lower melting temperature) and extended chain crystals (ECC, the stronger crystals, with a higher melting temperature). Annealing can assist in transferring the crystals and heal the crystallization defects, thickening the crystals and eliminate internal stress during orientation step.

Generally, the overall procedure is a newly developed modified gel spinning method. However, unlike the traditional well-established gel fiber spinning process, embodiments of the subject invention differ in three aspects: (1) conventional gel fiber spinning method use extruders to produce fiber, certain embodiments also employs an extruder, but the resultant product is in film form; (2) conventional gel fiber spinning method combines extrusion and stretching in a step, which is so-called fiber spinning during extrusion. However, certain embodiments of the subject invention divide extrusion and stretching into two separate steps. The extrusion step prepares the homogeneous un-oriented UHMWPE gel films. The orientation of the film can be accomplished afterwards in a hot stretching step; and (3) conventional gel fiber spinning protocol can only perform the stretching in non-isothermal environment. Films produced from isothermal stretching have improved mechanical properties over the non-isothermal counterparts. Certain embodiments described herein use isothermal hot stretching method to orient polymer chains.

Figure 25:
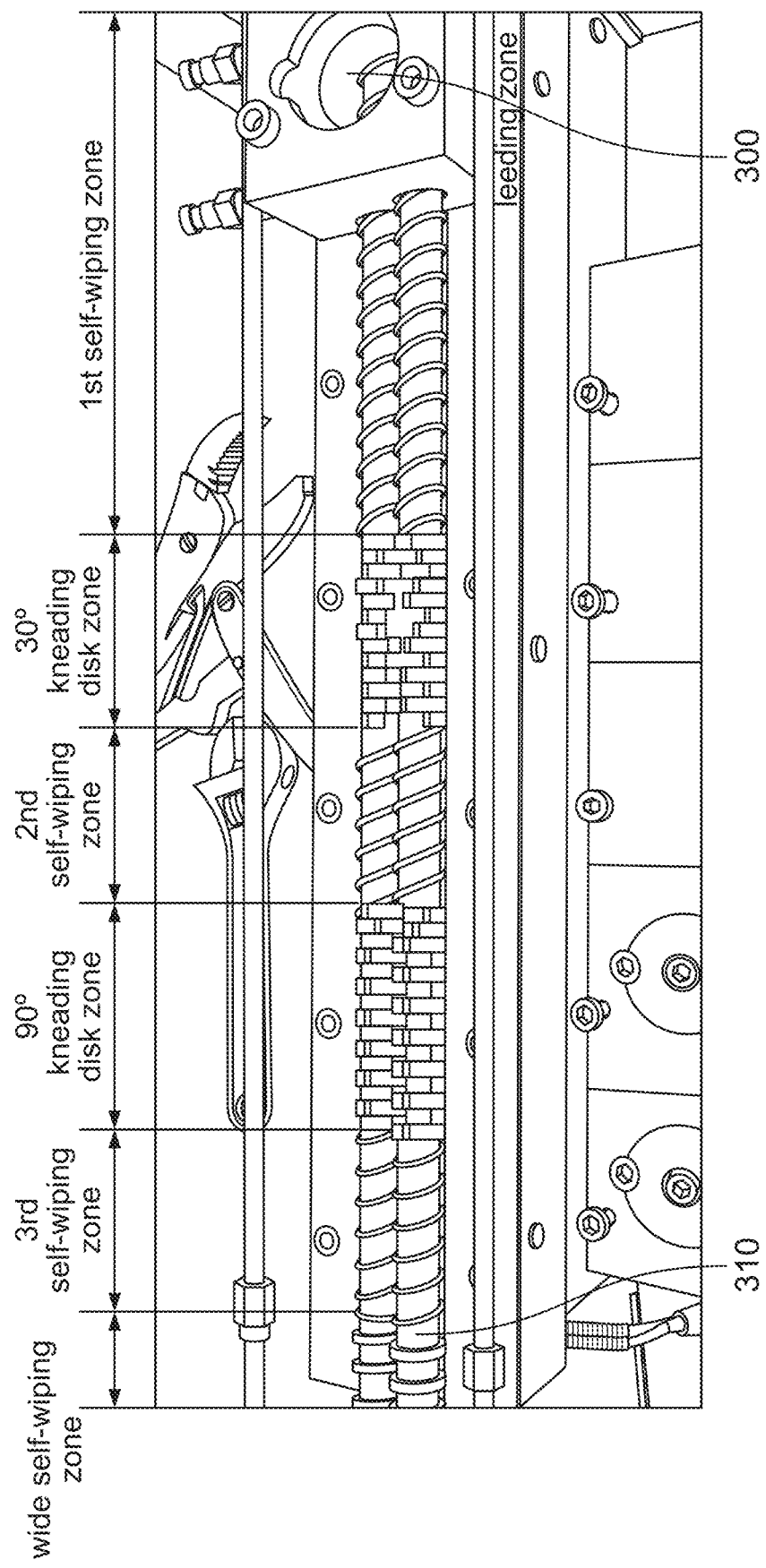
FIG. 25 is an image of a twin-screw extruder.

Embodiments of the subject invention provide methods for the preparation of biaxially oriented nanoporous UHMWPE membranes. Petrolatum (for example, 90 wt %) can be mixed with UHMWPE resin and antioxidants at a temperature of 120° C. and mechanically stirred stirring to form a homogenous suspension. The suspension can be fed into an extruder, for example a twin-screw extruder, to prepare a gel filament. Regardless of the specific mode and configuration of extruder, in preferred embodiments a temperature gradient profile can be set from the feeding zone 300, as seen in FIG. 25, or hopper to the exit zone of the extruder barrel 310, from 120° C. to 220° C., The temperature at the exit of the extruder (not shown in FIG. 25) should be no higher than 180° C., or phase separation or flow instabilities may occur.

The extruded gel filament can be collected after the filament has cooled down and reeled onto a roller. The gel filament can be fed into the feeding zone or hopper to be extruded again. The extruded filament structured die can be a pressed by a roller and thus the extruded product will be a film. The temperature profile can determine the homogeneity and quality of the extruded films. For the second time extrusion, the temperature profile can be the same with the first time extrusion, except for the exit zone temperature. It should be no higher than 170° C. but no lower than 140° C. In order to avoid orientation on the extruded gel films, an extruder feed roller can be used and the collection linear speed can be set to be identical with the extrusion speed.

After collection of the gel film, the film can be stretched in an environment chamber, in which the temperature can be kept homogeneous and constant. In preferred embodiments, a gauge length of the gel film can be increased at a rate or stretching speed of approximately 200%/min, and the stretching temperature can be 120° C. In preferred embodiments, the gel film can be stretched by biaxial stretching equipment. In other embodiments, the gel film can be stretch by uniaxial stretching equipment, including stretching the gel film in two perpendicular directions in sequence. The drawing ratio can be 600% times 600%. The drawing ratio is the percentage increase in distance of two perpendicular gauge lengths of the gel film.

The stretched gel film can by subjected to post-stretching annealing at a temperature of 125° C. for a period of no less than 5 minutes and no more than 15 minutes. The gel film can be slowly cooled down before unloading the film. The petrolatum can be extracted using solvent extraction method (for example, N-hexane extraction at 50° C.). During extraction, the constraints can be applied to inhibit the film from shrinking, and can be applied throughout the entire extraction process, as seen in FIG. 1.

In other embodiments of the subject invention, solvents for UHMWE can include petroleum jelly, Protopet 1S from Sonneborn®, a chemical substance identified by the CAS Registry Number 8009-03-8, or other substance that a thermodynamically miscible solvent that can reduce the high melt viscosity of UHMWPE for processing and used for swelling into a UHMWPE polymer chain network. Swelling the polymer chain can enlarge the inter chain distances and as a result the entanglement density can be reduced. In other embodiments, a solvent with similar chemical composition and structure can be used. In order to stabilize the material at a high temperature, antioxidants can be used to inhibit and terminate a free radical cascade reaction, for example phenolic and phosphatic antioxidants, "Irganox 1010®," and "Irgafos 168®." Petrolatum (95 wt %) can be mixed with UHMWPE resin and antioxidants and mechanically stirred at a temperature of 120° C. to form a homogenous suspension. The suspension can be automatically fed into an extruder, including a twin-screw extruder, in order to prepare a gel filament. Regardless of the specific mode and configuration of extruder, in preferred embodiments a temperature gradient profile can be set from the feeding zone or hopper 300, as seen in FIG. 25, to the exit zone 310 of an extruder barrel or the portion of the extruder, from 120° C. to 200° C. The temperature at the exit of the extruder (not shown in FIG. 25) should be no higher than 170° C., or phase separation or flow instabilities may occur.

The extruded gel filament can be collected after cooling down and reeled onto a roller. The extruded gel filament can be fed into the feeding zone or hopper and extruded again. The filament structured die can be pressed by a roller to form a film structured die. The temperature profile can determine the homogeneity and quality of the extruded films. For the second time extrusion, the temperature profile is the same with the first time extrusion, except for the exit zone temperature, which in preferred embodiments is no higher than 160° C. but no lower than 140° C. In order to avoid orientation on the extruded gel films, an extruder feed roller can be used and the collection linear speed can be set to be identical with the extrusion speed.

After collecting the gel film from the extruder, the gel film is stretched in an environment chamber whereas the temperature is kept homogeneous and constant. A gauge length of the gel film can be increased at a rate or stretching speed can be approximately 500%/min, and the stretching temperature can be 120° C. In preferred embodiments, the gel film can be stretched by biaxial stretching equipment. In other embodiments, the gel film can be stretch by uniaxial stretching equipment, including stretching the gel film in two perpendicular directions in sequence. The draw ratio can be 2000% times 2000%.

The stretched gel film can by subjected to post-stretching annealing at a temperature of 135° C. for a period of no less than 5 minutes and no more than 15 minutes. The gel film can be slowly cooled down before unloading the film. The petrolatum can be extracted using solvent extraction method (for example, N-hexane extraction at 50° C.). During extraction, the constraints can be applied to inhibit the film from shrinking, and can be applied throughout the entire extraction process, as seen in FIG. 1.

Low equivalent weight perfluoro-sulfonated acids (for example, low EW Nafion®) can be dissolved in isopropanol solution at temperature of approximately 100° C. to produce a nafion-isoproponal solution. After the petrolatum is extracted, Nafion-isopropanol solution can be injected into the pores. Injection into the pores can be accomplished by naturally phenomenon such as the capillary pumping effect or diffusion by chemical potential or by artificial methods. The Nafion-isopropanol solution can also be applied to the back side of the membrane. The membranes can be allowed to dry and impregnation-drying cycle can be repeated according to the pre-designed properties of the composite membranes. The composite membranes can be annealed at a temperature of 130° C. for 12 hours, including in a vacuum oven. The composite membranes can be washed with hydrogen peroxide, sulfuric acid, and DI water to remove organic contaminants In order to adjust the pore closure temperature, as the draw ratio increases, the pore closure temperature also increases. For example, when the draw ratio approaches 2000%×2000%, then the pore closure temperature is 150° C.

In yet another embodiment of the subject invention, UHMWPE (molecular weight=3.5×106 g/mol) resin can be dispersed into a melt petrolatum at 100° C. and mechanically stirred to form a homogeneous suspension. The mixture can be extruded, for example with a twin screw extruder, and fabricated into a free extruded film with a dimension of about 1 mm thick and 10 cm wide. The extruded film can be biaxially hot stretched at 120° C. with draw ratio of 6×6. The stretched film can be subjected to an annealing temperature of 125°° C. for 15 minutes. After cooling down to room temperature, the solvent (petrolatum) can be extracted, for example by N-hexane. Throughout the process a constraint can be applied to the membrane to inhibit structural collapsing due to entropic elasticity, as seen in FIG. 1. Low equivalent weight perfluoro-sulfonated acids (for example, low EW Nafion) can be dissolved in isopropanol solution at a temperature of approximately 100° C. The Nafion-isopropanol solution can be transferred from the stirring container onto UHMWPE membrane surface. Before transferring Nafion-isopropanol solution onto the membrane, isopropanol can be sputtered onto the back side of the membrane. The membrane can be turned over and the Nafion-isopropanol solution can be transferred to the front side. The Nafion-isopropanol solution can be injected into the pores. Injection into the pores can be accomplished by naturally phenomenon such as the capillary pumping effect or diffusion by chemical potential or by artificial methods. The Nafion-isopropanol solution can also be applied to the back side of the membrane. The membranes can be allowed to dry and impregnation-drying cycle can be repeated according to the pre-designed properties of the composite membranes.

The composite membranes can be annealed at a temperature of 130° C. for 8 hours, for example in a vacuum oven. The composite membranes can be washed with hydrogen peroxide, sulfuric acid, and DI water to remove organic contaminants.

The resulting nanoporous ultra-high molecular weight polyethylene (UHMWPE) membrane separator can be applied to various kinds of separation processes, and provides rapid pore closure with simultaneous toughening functionality. The average equivalent pore diameter of the membrane is approximately 35 nm and the volumetric porosity is over 60%. Rapid pore closure can be performed by annealing the membrane separators at 145° C. in 7 seconds. The surface pore structure can shut down with a simultaneous drastic enhancement in both tensile strength (300 MPa, 200% increase) and Young's moduli (1.9 GPa, 250% increase). Certain embodiments of the nanoporous UHMWPE membrane can be applied as separators in energy conversion and storage devices, lithium-ion batteries (LIB), and function as both separator and safety device.

Figure 18:
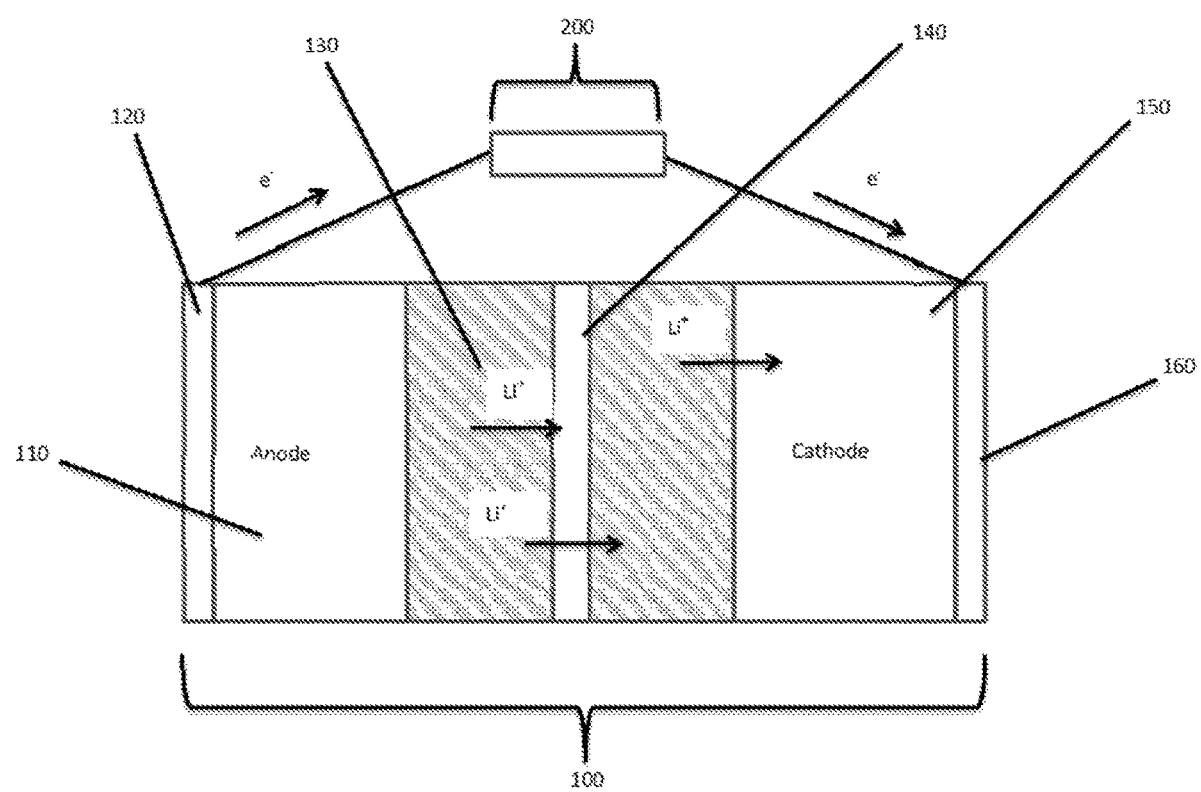
FIG. 18 shows a diagram of a Lithium-ion battery.

Embodiments of the subject invention include a lithium-ion battery, as seen in FIG. 18. The lithium-ion battery 100 includes an anode 110, a cathode 150, a case 120, 160 surrounding the anode and cathode, an electrolyte 130 facilitating ionic movement, and a separator 140 between the anode and the cathode. The battery 100 can be connected by wires to a load 200 drawing power from the battery. When discharging, the battery is configured to allow lithium ions to pass from the anode 110 (negative electrode) through the separator 140 to the cathode 150 (positive electrode). When recharging, the battery is configured to allow lithium ions to travel from the cathode 150 back to the anode 110. The separator 140 can include any material produced by the embodiments described herein. In other embodiments the above described methods can be used fabricate a membrane or a separator in fuel cells, flow batteries, or other energy related devices.

Figure 19A:
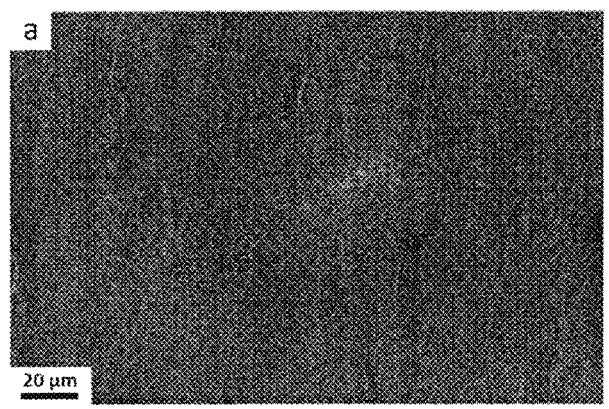
FIGS. 19a-19c show the SEM images of the UHMWPE membraneF145 separator (P-class) surfaces at different magnifications under a low-voltage scanning electron microscope (LV-SEM).
Figure 19B:
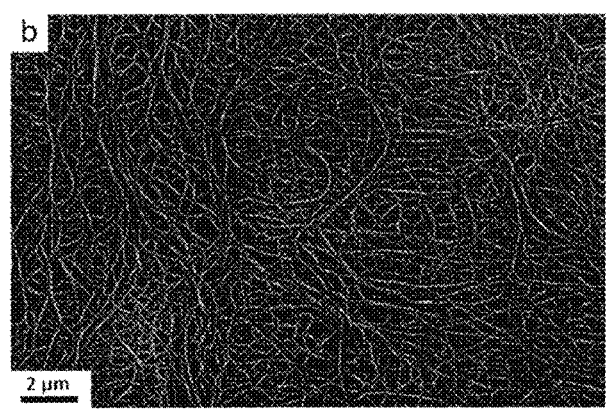
Figure 19C:
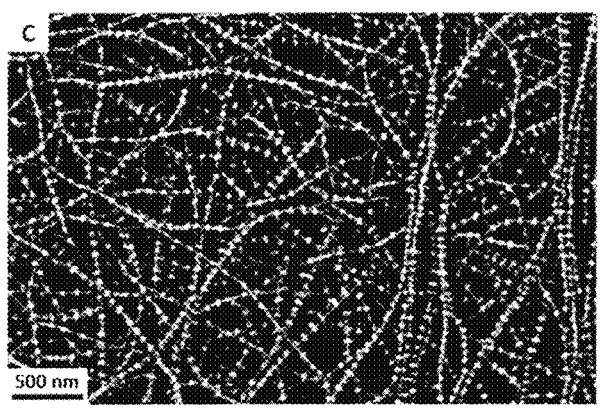

FIGS. 19a-19c show the SEM images of the UHMWPE membrane separator (P-class) surfaces at different magnifications under a low-voltage scanning electron microscope (LV-SEM). The lower magnification image in FIGS. 19a and 19b shows that the newly prepared porous membrane is highly homogeneous and consists of interpenetrating fibrous network structures. The higher magnification image in FIG. 19c reveals that the interpenetrating nanofibrillar networks are the frameworks for the confinement of the uniformly distributed ≈200 nm diameter pores. The nanofibrils are strings of pearl necklaces of "shish-kebab" crystals randomly aligned in the plane surface. The cores of the necklaces are made of extended chain shish crystals with diameters ≈16 nm and the periodically (spacing ≈100 nm) attached beads with thicknesses ≈32nm and widths ≈45 nm are the folded chain kebab crystals.

Polymer melts and solutions can undergo flow-induced transitions into shish-kebab self-reinforced composite crystalline structures due to coil-stretch transformations. Very few studies are available on the self-reinforced composite shish kebab crystalline structures in porous films or fibers. Mechanistically, these kebab crystals are due to the annealing induced partial melting and recrystallization of the imperfectly aligned shish crystals where the unmelted shish crystals act as the nucleation sites for these kebabs. This process is analogous to that for the formation of self-reinforced composite of compacted UHMWPE gel-spun fibers.

The volumetric porosity of the newly prepared UHMWPE membrane was characterized by liquid absorption technique. Weight uptake of mineral oil at room temperature was performed and the porosity was estimated according to the following equation.

$$\rho(\%) = \left(\frac{W - W_0}{\rho_L V_0}\right) \times 100 \qquad (1)$$

Where $W$, $W_0$ are the weights of the separator membrane before and after immersion in liquid mineral oil, $\rho_L$ is the density of mineral oil, and $V_0$ is the geometric volume of the separator membrane, respectively. This gives a volumetric porosity of 78.3%. This is about 56% higher than typical commercial polyolefin membranes and hence the P-class membrane is expected to exhibit higher electrolyte uptake and lower impedance.

Figure 20A:
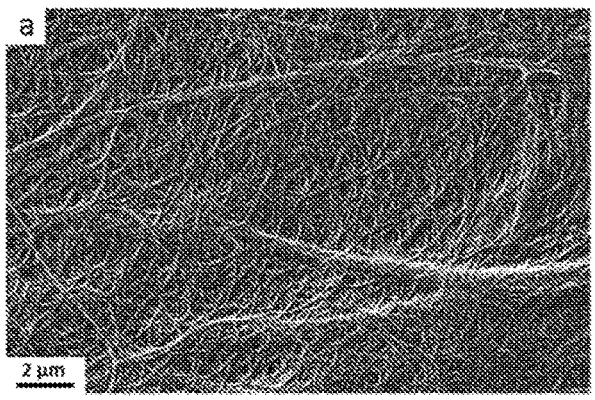
FIGS. 20a and 20b show and SEM image of a D-class membrane surface.
Figure 20B:
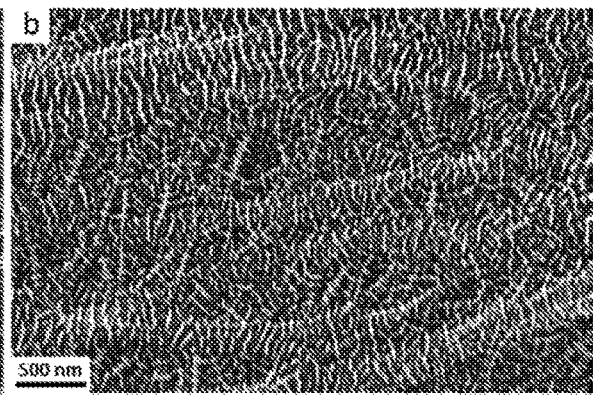

Simulated thermal fuse functionality of these P-class membranes was carried out by subjecting these membranes to an annealing temperature of 145° C. for 7 seconds under lateral dimension constraints. This temperature is above the melting temperature of the kebab crystals, but lower than the shish-crystals determined under differential thermal Calorimetry (DSC). The membranes after thermal annealing are categorized as D-class, and their surface microstructures are depicted in FIGS. 20a and 20b. The lower magnification SEM image in FIG. 20a shows that the D-class membrane retains the shish-kebab self-reinforced composite and interpenetrating fibrous network structure reminiscent of that of the P-class. In the meantime, the number density and widths of the epitaxial kebabs increased significantly. As can be seen from the magnified image in FIG. 20b, the inter kebab distance decreased by about 40% to 60 nm. In the meantime, there is a small decrease in kebab thickness to ≈25 nm. The widths of the kebabs doubled to ≈92 nm. The shish diameter also becomes twice as thick to ≈30 nm. These microstructural changes can suggest two different mechanisms for the pore shutdown process (1) the melting and recrystallization of kebabs, and (2) the thickness contraction that leads to the densification of films. Physical constraints of lateral dimensions during thermal annealing ensures only thickness contraction was possible during the pore closure process. The film thickness decreased from ≈6 μm (P-class) to ≈2 μm (D-class) after thermal annealing.

Figure 21:
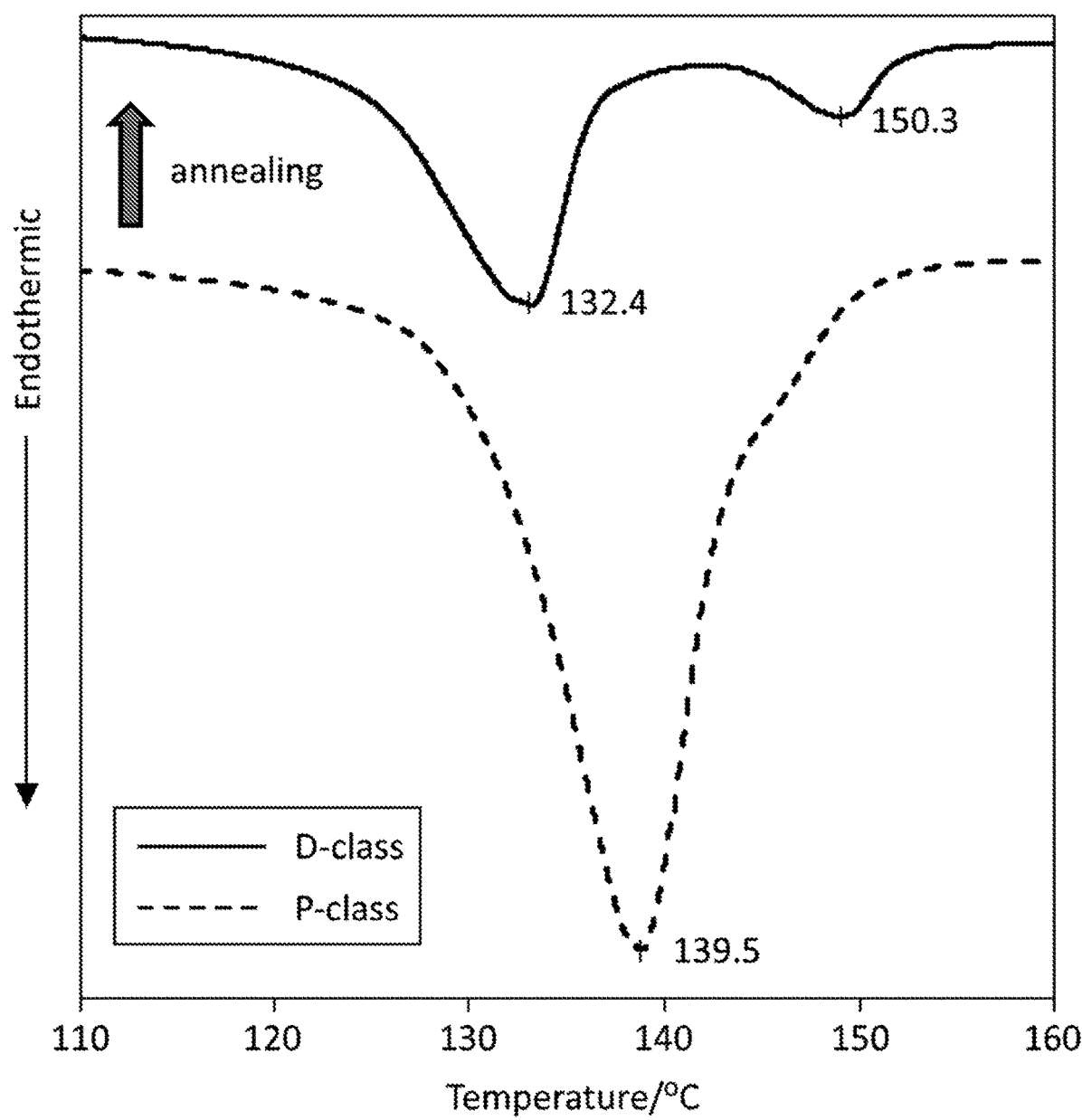
FIG. 21 shows a plot of DSC heat flow rate curve of membranes before (P-class) and after (D-class) pore closure.

In order to elucidate these morphological changes, thermal transition behavior of the membranes before and after pore closure were characterized under DSC at a standard heating/cooling rates of 10° C. min$^{-1}$. All measurements were performed on samples confined by compaction of aluminum flat pans. The plots depicted in FIG. 21 show the heating endotherms for the P-class (dashed line) and D-class (solid line) membranes, respectively. The P-class exhibits a broad melting transition endotherm with a melting temperature of 139° C. and a broad shoulder at ≈145° C. Integration of the melt transition endotherm gives a crystallinity of ≈86% by assuming a heat of fusion of 293.6 J g$^{-1}$ for polyethylene single crystals.

The broad melting transition depicted here is consistent with that expected from the SEM images in FIGS. 19a-19c. The folded chain kebab crystals display lower melting temperatures than the equilibrium melting temperature of 143° C. for polyethylene and the extended-chain shish crystals may superheat and are expected to display higher melt transition temperature. The D-class membranes (solid line) show two distinct melting peaks: the first melting peak is at ≈132° C., and a second at ≈150° C. The lower melting peak is now lower than that of the P-class (dashed line), but the higher one is higher and more pronounced.

The observed decrease in the lower melting temperature of the endotherm plot of D-class membrane is consistent with the fact that the kebab thickness in the D-class membranes is ≈21% thinner than those in the P-class (25 vs 32 nm). The increase in melting temperature of the shish crystals is also consistent with that expected from the doubling shish diameters in FIG. 20b. As the shish diameter increases, the number of aligned chains in each fibrillar shish crystal increases and hence resulting a stronger superheating effect. On the other hand, the D-class membrane exhibits a crystallinity of ≈52% which can be is 40% lower than that the P-class.

Kebab crystals in the P-class membrane can become molten during thermal annealing at 145° C. Some of these molten polymer chains can form epitaxial kebab crystals on the shish-backbones upon cooling and some will remain amorphous. This can be due to the drastically reduced chain mobility in molten high entanglement density UHMWPE. The thickening of the shish-crystals can be the result of the densification of the membrane in the thickness direction during thermal annealing.

Safety of LIBs includes tensile strengths to withstand spiral winding load, puncture strength to mitigate particle pultrusion, dimensional stability and mechanical integrity in case of a thermal runaway reaction, as well as a rapid impedance increase for electrical circuit shutdown capability. Summary of the safety performance of these membranes is presented in FIGS. 22a-22d. FIG. 22a shows the tensile stress-strain curves of the P-and D-class membranes at the ambient temperatures. In order to characterize the drawing sequence effect on the membrane's mechanical performance, measurements were carried out both in the machine direction (first drawing direction) and in the transverse direction (second drawing direction). The two dashed lines represent the data measured on the P-class and the two solid lines on the D-class. Clearly, the maximum differences in tensile stresses between drawing directions are less than 5% and it may be safely assumed that the molecules in the plane direction have no preferred molecular orientations.

The tensile strengths of the separator P-class membrane (dashed lines) in FIG. 22a are ≈180 MPa. This is similar to that of Celgard® membranes measured in the machine direction, but more than 1100% higher than those measured in the transverse direction of Celgard® membranes. It is 800% higher than the Celgard® membranes measured at 45° to the machine direction.

As a battery may become overheated during charging, dimensional stability and mechanical integrity are critical to mitigate electrode contacts. The lateral dimensions of the UHMWPE separators can be readily constrained via clamping between two metal plates suggesting high dimensional stabilities against abuse temperature effects. Plots in FIG. 22b show the tensile behavior of the membrane at 125° C. (dashed line, before pore shutdown) and 145° C. (solid line, after pore shutdown) under lateral dimensional constraints via film folding on the sides transverse to the displacement direction. Clearly, the UHMWPE membranes are highly ductile extremely strong. Elongation and tensile stress prior to fracture reached 350% (500% at 145° C.) and 130 MPa, respectively. Lateral dimension contraction was readily suppressed by folding the membranes one the sides during tensile testing. The data presented in FIG. 22b had been subtracted from those folded edges measured independently In addition to tensile resilience, the membranes can possess sufficient puncture resistances to mitigate potential short circuiting of LIBs due to piercing failures induced by micrometer-sized particles in the system. Two sources of micrometer sized particles are identified: (1) loosened catalytic particles falling from the electrodes during spiral winding process, and (2) the lithium dendrites formed after prolonged period of charge-discharge cycles. The size of these particles can limit the minimum separator thickness for safety requirement.

Puncture strength test results are depicted in FIG. 22c using a 3 mm diameter stainless steel ball according to ASTM F1306-16 standard at a normal force loading speed of 25 mm min$^{-1}$. In order to demonstrate the superior puncture resistance of the P-class membranes, data on commercial trilayer Celgard 2325® separators (solid lines) are also superposed.

The plots in FIG. 22c show that the UHMWPE P-class membranes are much more puncture resistant than that of the commercial Celgard® membranes. First, the total load per unit membrane thickness in P-class membrane is about 52% higher (0.52 vs 0.34 N μm$^{-1}$). Second, it also displays a stronger puncture hardening behavior that is absent from the Celgard® membranes. As can be seen from the plots of the first order derivative of puncture load versus penetration displacement in FIG. 22c, the P-class membranes are ≈250% higher in strain hardening rates. Third, the total displacement per membrane thickness of P-class membrane is also about 250% larger than that of the Celgard® separators. The puncture failure displacement per unit membrane thickness in P-class membrane is ≈0.83 mm μm$^{-1}$ and that for Celgard® is ≈0.32 mm μm$^{-1}$. Finally, the mode of failure in the P-class membrane can be localized around the pinhole after fracture, whereas that in the Celgard catastrophic. The Celgard membrane displayed simultaneous film splitting along the machine direction of the membrane accompanied with pinhole fracture. It should be stated that the total puncture load in the P-class membrane at 6 μm is ≈3 N which satisfies the safety requirement for separators for use in spiral winding LIBs.

Besides, the puncture hardening versus displacement characteristics suggests that the P-class membrane separators can help to annihilate lithium dendrites grown during cell charge/discharge processes. As the reactive load exerted by large deformations, it is possible that it might reach a value that is comparable with the strength of the dendrites and hence may help to limit dendrite preparation.

The UHMWPE P-class membrane can also exhibit a strong self-healing behavior when the applied puncture load is below 100 g, suggesting that the membrane will have high fatigue resistance during the charge/discharge cycles. Complete shape recovery is observed within 2 min after load removal.

Tensile properties of the D-class membrane can be higher than that of the P-class at both the ambient temperature and high temperatures. As seen in FIG. 22a, the tensile strength of the D-class membrane is up to 550 MPa. This is 300% stronger than that of the P-class and about the same as that of a stainless steel. Even at the high temperature of 145° C., the membrane exhibits a tensile strength of 160 MPa. These high tensile strength values are again due to the shish-kebab self-reinforced composite microstructures in the D-class membrane. The retention of high molecular alignment in conjunction with the densification due to thickness reduction leads to such high tensile strengths. These high tensile strengths are highly desirable for a robust membrane in case of the unfortunate overcharging or runaway reactions in LIBs. Similar to the tensile performances, the puncture resistance also increased significantly after pore shutdown.

The maximum puncture load for the D-class is ≈470 g. It should be noted that the membrane thickness for D-class is ≈2 µm. This is 4.6 times of that of P-class membrane in terms of load per unit membrane thickness. Besides, the dimensional stability during pore closure process is also critical. The strong viscoelasticity of P-class membrane can enable its lateral dimensions to be fully constrained during annealing.

In order to be an effective thermal fuse to provide the inherent safety protection for LIBs, the separator should exhibit discontinuous impedance increase to shut down the electrical circuit in the event of overcharging runaway reactions. The thermal fuse performances were characterized using electrochemical spectrometry on CHI760E. Nyquist plots for the P-class (prior to pore closure) and D-class membranes (after pore closure) sandwiched between blocking stainless steel plate electrodes are depicted in FIG. 22d. The porous separators (P-class) display no semicircle responses at all frequencies, but the dense D-class separators show a suppressed semicircle at high frequencies followed by a linear increase of Z" against Z' in the low frequency regime. From the intercept of the semicircle arc with Z' axis, the bulk resistance of the D-class membrane is ≈14 900Ω. This represents more than 18 000 times increase in comparison that for the P-class (0.81Ω). The bulk resistance for P-class was taken as the intercept of the straight line on Z' axis at high frequencies. Thus it may be safely assumed that the redox reactions on the battery electrodes will be suppressed and no notable electrical current flow for further temperature rise will take place after pore closure.

To further verify these characterizations, EIS measurements on 2025 coin cells were further carried out. Cells were assembled by sandwiching the membrane in between $LiCoO_2$/BP2000/PVDF (8:1:1 wt %) cathode and lithium metal anode, with 1 mol/L $LiPF_6$ in EC/DMC/EMC (1:1:1 vol %) electrolyte, and after two cycles of activation at 100% discharge state. Nyquist plots for cells prepared using these separators are presented in FIGS. 23a, 23b, respectively. The charge transfer resistances are ≈170Ω for cells prepared using separators prepared with UHMWPE P-class (dashed line in FIG. 23a) and Celgard® (solid line in FIG. 23a) membranes. Cells prepared using the UHMWPE D-class membrane shows a more than 550 times increase in charge transfer resistance of $9.7 \times 10^4$Ω.

The cyclic cell performance tests at 1° C. charge/discharge rate and 30° C. within the range of 3.0-4.3 V for 50 cycles were carried out on 2025 coin cells prepared using P-class and Celgard® separators as those in FIG. 23a. The cyclic dependence capacitance plots are presented in FIG. 24. Clearly, the P-class cells exhibit consistently higher capacity than those of the Celgard® especially after 15 cycles. For example, at the end of the 50 cycles, the charge capacitance for P-class is about 7.4% higher than that of the Celgard® (130.6 vs 121.6 mAh $g^{-1}$). The UHMWPE P-class separator cells also exhibit a more stable charge and discharge capacity compared with Celgard®. The capacitance retention by ignoring the first cycle is 96% whereas for Celgard® is 90%. It is also important to note that the capacitances measured on charge and discharge at the same cycle for cells prepared using P-class separators are almost congruent. However, the Celgard® cells show increasing hysteresis with the discharge capacitance dropping faster as charge/discharge cycle increases. Hysteresis between charge and discharge in LIBs is believed to be determined by reaction kinetics which will result in fading capacitances. This phenomenon can become more significant at high charge/discharge rates and efforts in mitigating hysteresis have mostly been concentrated on design of electrodes. The quick charge feature in conjunction with cyclic capacitance retention exhibited by the UHMWPE P-class separator is extremely desirable in all LIB energy storage devices.

The UHMWPE P-class membrane separators can simultaneously exhibit strong mechanical, electrochemical safety characteristics, and high cyclic cell performance at high charge/discharge rates. The high charge rate and cyclic capacity retention efficiency can be due to the high volumetric porosity and small membrane thickness. The effective thermal fuse functionality can be due to the strong biaxial molecular anisotropy of self-reinforced composite microstructure. Retention of molecular orientations upon pore closure leads to a drastic 300% increase in tensile and puncture strength. The localized puncture failure mode in the P-class separator is a result of higher tensile toughness of UHMWPE. Therefore, the newly prepared thin and robust self-reinforced composite UHMWPE separators with high cycle and cell performances offer solutions to the pareto fronts in current separators. Additionally, the increasing puncture resistance with displacement suggests that the P-class membrane separators might potentially mitigate lithium dendrite growths during cell charge/discharge cycles.

The subject invention includes, but is not limited to, the following exemplified embodiments.

Embodiment 1

A method for the preparation of a biaxially oriented nanoporous ultra-high-molecular-weight polyethylene (UHMWPE) membrane, the method comprising:

combining a petroleum jelly, a UHMWPE, and an antioxidant;

stirring the petroleum jelly, the UHMWPE, and the antioxidant to form a suspension;

feeding the suspension into an extruder to produce a gel filament;

pressing the gel filament to form a gel film;

stretching the gel film to a desired set of dimensions;

subjecting the stretched gel film to an annealing temperature; and extracting the petroleum jelly from the stretched gel film.

Embodiment 2

The method of embodiment 1, wherein the petroleum jelly, the ultra-high-molecular-weight polyethylene (UHMWPE), and the antioxidant are stirred at a temperature of 120° C.

Embodiment 3

The method according to any of embodiments 1-2, wherein the petroleum jelly includes petrolatum, white petrolatum, or a semi-solid mixture of hydrocarbons.

Embodiment 4

The method according to any of embodiments 1-3, wherein the antioxidant includes a phenolic antioxidant or a phosphatic antioxidant.

Embodiment 5

The method according to any of embodiments 1-4, wherein the suspension is homogenous.

Embodiment 6

The method according to any of embodiments 1-5, wherein the extruder is a twin-screw extruder.

Embodiment 7

The method according to any of embodiments 1-6, wherein a temperature gradient between the feeding zone of the extruder and the exit zone is 120° C. and 220° C.

Embodiment 8

The method according to any of embodiments 1-6, wherein a temperature at an exit is 180° C.

Embodiment 9

The method according to any of embodiments 1-8, wherein pressing the gel filament into a gel film is performed by a roller.

Embodiment 10

The method according to any of embodiments 1-9, wherein the gel filament extruded from the extruder is fed into the feeding zone of extruder and passed through the extruder.

Embodiment 11

The method according to any of embodiments 1-10, wherein the temperature of the exit zone after the gel filament has been fed into extruder is in a range of from 140° C. and 170° C.

Embodiment 12

The method according to any of embodiments 1-11, wherein the speed of the circular motion of the roller is equal to the extrusion speed of the extruder.

Embodiment 13

The method according to any of embodiments 1-12, wherein the gel film is stretched in a controlled environment, wherein a temperature is homogenous and constant.

Embodiment 14

The method according to any of embodiments, 1-13, wherein a percentage increase in a distance of two perpendicular gauge lengths of the gel film is 600%×600%.

Embodiment 15

The method according to any of embodiments, 1-13, wherein a percentage increase in a distance of two perpendicular gauge lengths of the gel film is 2,000%×2,000%.

Embodiment 16

The method according to any of embodiments 1-15, wherein a gauge length of the gel film can be increased at a rate of 200%/min and the temperature is 120° C.

Embodiment 17

The method according to any of embodiments 1-16, wherein the gel film is stretched by a biaxial stretching device.

Embodiment 18

The method according to any of embodiments 1-17, wherein the gel film is stretched by a uniaxial stretching device, wherein the gel film is stretched in two perpendicular directions in sequence.

Embodiment 19

The method according to any of embodiments 1-18, wherein the stretched gel film is annealed at an annealing temperature of 125° C.

Embodiment 20

The method according to any of embodiments 1-19, wherein subjecting the stretched gel film to an annealing temperature is for a period of no less than 5 minutes and no greater than 15 minutes.

Embodiment 21

The method according to any of embodiments 1-20, wherein the petroleum jelly is extracted by a solvent based extraction method, including N-hexane extraction method at 50° C.

Embodiment 22

The method according to any of embodiments 1-21, wherein the stretched gel film is subjected to a pore closure temperature of 145° C.

Embodiment 23

The method according to any of embodiments 1-21, wherein the stretched gel film is subjected to the pore closure temperature for a period of seven seconds.

Embodiment 24

The method according to any of embodiments 1-21, wherein the stretched gel film is subjected to thermal annealing at a pore closure temperature of 150° C.

Embodiment 25

The method according to any of embodiments 1-21, wherein the stretched gel film is subjected to thermal annealing the pore closure temperature for a period of seven seconds.

Embodiment 26

A method for the preparation of a biaxially oriented nanoporous ultra-high-molecular-weight polyethylene (UHMWPE) membrane, the method comprising:

combining a petroleum jelly, a ultra-high-molecular-weight polyethylene (UHMWPE), and an antioxidant;
stirring the petroleum jelly, the UHMWPE, and the antioxidant to form a suspension;
feeding the suspension into an extruder to produce a gel filament;
pressing the gel filament to form a gel film;
stretching the gel film to a desired set of dimensions;
subjecting the stretched gel film to an annealing temperature;
extracting the petroleum jelly from the stretched gel film;
dissolving a low equivalent weight perfluoro-sulfonated acid in a isopropanol solution;
inserting the low equivalent weight perfluoro-sulfonated acid-isopropanol solution into a pore on a first surface of the stretched gel film; and
subjecting the stretched gel film with the low equivalent weight perfluoro-sulfonated acid-isopropanol solution inserted into a pore on a first surface of the stretched gel film to an annealing temperature.

Embodiment 27

The method of embodiment 26, wherein the petroleum jelly, the ultra-high-molecular-weight polyethylene (UHMWPE), and the antioxidant are stirred at a temperature of 120° C.

Embodiment 28

The method according to any of embodiments 26-27, wherein the petroleum jelly includes petrolatum, white petrolatum, or a semi-solid mixture of hydrocarbons.

Embodiment 29

The method according to any of embodiments 26-28, wherein the antioxidant includes a phenolic antioxidant or a phosphatic antioxidant.

Embodiment 30

The method according to any of embodiments 26-29, wherein the suspension is homogenous.

Embodiment 31

The method according to any of embodiments 26-30, wherein the extruder is a twin-screw extruder.

Embodiment 32

The method according to any of embodiments 26-31, wherein a temperature gradient between the feeding zone of the extruder and the exit zone is 120° C. and 200° C.

Embodiment 33

The method according to any of embodiments 26-32, wherein a temperature at an exit of the extruder is 170° C.

Embodiment 34

The method according to any of embodiments 26-33, wherein pressing the gel filament into a gel film is performed by a roller.

Embodiment 35

The method according to any of embodiments 26-34, wherein the gel filament extruded from the extruder is fed into the feeding zone of extruder and passed through the extruder.

Embodiment 36

The method according to any of embodiments 26-35, wherein the temperature of the exit zone after the gel filament has been fed into extruder is in a range of from 140° C. and 160° C.

Embodiment 37

The method according to any of embodiments 26-36, wherein the speed of the circular motion of the roller is equal to the extrusion speed of the extruder.

Embodiment 38

The method according to any of embodiments 26-37, wherein the gel film is stretched in a controlled environment wherein the temperature is homogenous and constant.

Embodiment 39

The method according to embodiment 38, wherein a percentage increase in a distance of two perpendicular gauge lengths of the gel film is 600%×600%.

Embodiment 40

The method according to embodiment 38, wherein a percentage increase in a distance of two perpendicular gauge lengths of the gel film is 2,000%×2,000%.

Embodiment 41

The method according to any of embodiments 26-40, wherein a gauge length of the gel film can be increased at a rate of 500%/min at a temperature of 120° C.

Embodiment 42

The method according to any of embodiments 26-41, wherein the gel film is stretched by a biaxial stretching device.

Embodiment 43

The method according to any of embodiments 26-42, wherein the gel film is stretched by a uniaxial stretching equipment, wherein the gel film is stretched in two perpendicular directions in sequence.

Embodiment 44

The method according to any of embodiments 26-43, wherein the annealing temperature is 135° C.

Embodiment 45

The method according to any of embodiments 26-44, wherein subjecting the stretched gel film to an annealing temperature is for a period of no less than 5 minutes and no greater than 15 minutes.

Embodiment 46

The method according to any of embodiments 26-45, wherein the petroleum jelly is extracted by a solvent based extraction method, including N-hexane extraction method at 50° C.

Embodiment 47

The method according to any of embodiments 26-46, wherein the low equivalent weight perfluoro-sulfonated acids is dissolved in the isopropanol solution at temperature of 100° C.

Embodiment 48

The method according to any of embodiments 26-47, further comprising applying isopropanol to a second surface, wherein the second surface is an on opposite face of the stretched gel film than the first surface.

Embodiment 49

The method according to any of embodiments 26-48, wherein the stretched gel film with the low equivalent weight perfluoro-sulfonated acid-isopropanol solution inserted into a pore on a first surface of the stretched gel film is subjected to an annealing temperature of 130° C.

Embodiment 50

The method according to any of embodiments 26-49, wherein the stretched gel film with the low equivalent weight perfluoro-sulfonated acid-isopropanol solution inserted into a pore on a first surface of the stretched gel film is subjected to an annealing temperature for a period of 12 hours.

Embodiment 51

A battery device comprising:
an anode;
a cathode;
an electrolyte; and
a nanoporous membrane separating the cathode and the anode,
wherein the nanoporous membrane is produce by the method of any one of claim 1 or 20.

Embodiment 52

The battery device of embodiment 51, wherein the nanoporous membrane is injected with a low equivalent weight perfluoro-sulfonated acid.

Embodiment 53

A nanoporous membrane, the membrane comprising:
a nanoporous membrane,
wherein the membrane comprises a ultra-high-molecular-weight polyethylene,
wherein the membrane is biaxially oriented, and
wherein the membrane comprises a plurality of nanofibrils of shish-kebab crystals randomly aligned in the membrane.

Embodiment 54

The membrane of embodiment 53, wherein a thickness of the membrane is 6 μm.

Embodiment 55

The method according to any of embodiments 53-54, wherein a thickness of a kebab is 32 nm.

Embodiment 56

The method according to any of embodiments 53-55, wherein a width of a kebab is 46 nm.

Embodiment 57

The method according to any of embodiments 53-56, wherein a melting peak temperature of the membrane is 139° C.

Embodiment 58

The method according to any of embodiments 53-57, wherein a crystallinity of the member is 86%.

Embodiment 59

The method according to any of embodiments 53-58, wherein a tensile strength of the membrane is up to 180 MPa.

Embodiment 60

The method according to any of embodiments 53-59, the membrane being further subjected to a temperature of 145° C. for 7 second under lateral dimension constraints.

Embodiment 61

The method according to any of embodiments 53-60, wherein a thickness of the membrane is 2 μm.

Embodiment 62

The method according to any of embodiments 53-61, wherein a thickness of a kebab is 25 nm.

Embodiment 63

The method according to any of embodiments 53-62, wherein a width of a kebab is 92 nm.

Embodiment 64

The method according to any of embodiments 53-63, wherein a first melting peak temperature of the membrane is 132° C. and a second melting peak temperature is 150° C.

Embodiment 65

The method according to any of embodiments 53-64, wherein a crystallinity of the membrane is 52%.

Embodiment 66

The method according to any of embodiments 53-65, wherein a tensile strength of the membrane is up to 550 MPa.

Embodiment 67

The method according to any of embodiments 53-66, wherein a pore in the nanoporous membrane has a diameter of 35 nm.

Embodiment 68

The method according to any of embodiments 53-67, wherein the membrane has a volumetric porosity of greater than 60%.

Embodiment 69

The membrane as produced by the method of any one of claim 1 or 26, wherein the membrane is a separator in a fuel cell, flow battery, battery, or other energy application.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

UHMWPE biaxial oriented nanoporous membranes were prepared and constrained by stainless steel frames. The membranes were thermally treated at 145° C. for 15 minutes. After thermal treatment at 145° C. (annealing), the mechanical properties of the membranes were drastically enhanced. Table 1 lists the results of tensile properties of UHMWPE biaxial oriented nanoporous membranes before (P class) and after (D class) thermal treatment at 145° C.

TABLE 1

Tensile Properties of UHMWPE Biaxial Oriented Membranes

| Sample | Yielding Stress, σy (MPa) | Young's Modulus, E (MPa) | EAB (%) |
| --- | --- | --- | --- |
| P Class | 111.94 ± 6.84 | 592.44 ± 43.98 | 97 ± 11 |
| D Class | 337.20 ± 24.17 | 1193.25 ± 63.15 | 102 ± 12 |

Example 2

Figure 15:
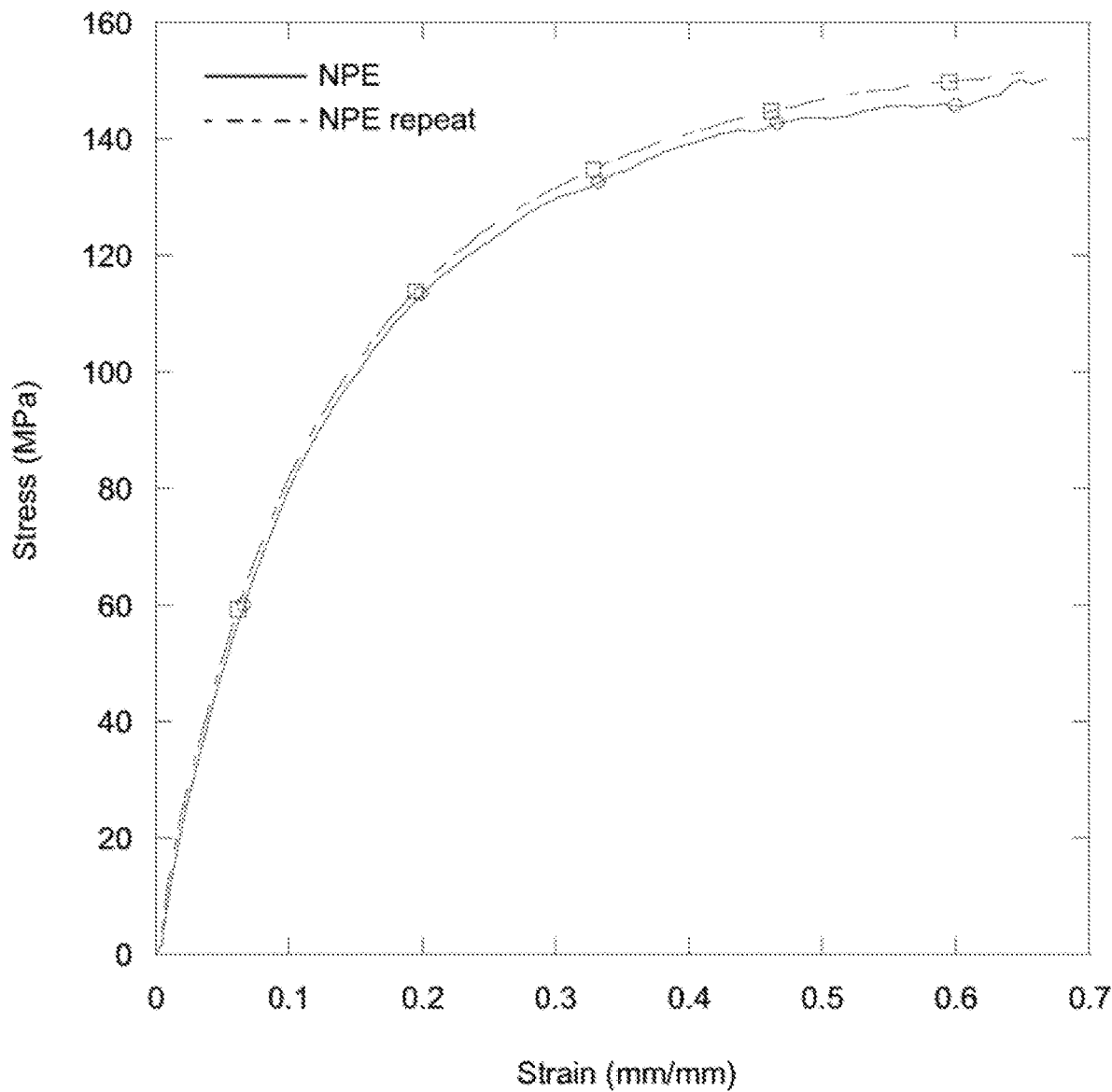
FIG. 15 shows a plot of stress-strain curves of Nafion®/UHMWPE composite membranes (NPE) of tensile tests.

Nafion®/UHMWPE composite membranes (NPE) were prepared and cut into 15 mm×10 mm rectangles for uniaxial tensile properties testing. Advanced Rheological Expansion System (ARES) was used to perform the tensile test. Gauge length was set to be 15 mm and extension speed was set to 2.5 mm/min. The results are shown in FIG. 15 and Table 2.

TABLE 2

Tensile Properties of NPE

| | Max. Stress (MPa) | Max. EAB | Fracture Energy (MPa) | Young's Modulus (GPa) |
| --- | --- | --- | --- | --- |
| NPE | 151 | 66% | 79 | 1.6 |

Mechanical strength of prepared NPE outperformed that of commercial Nafion®, which is less than 15 MPa in maximum stress for both Nafion 211 and 117®.

Example 3

Figure 17:
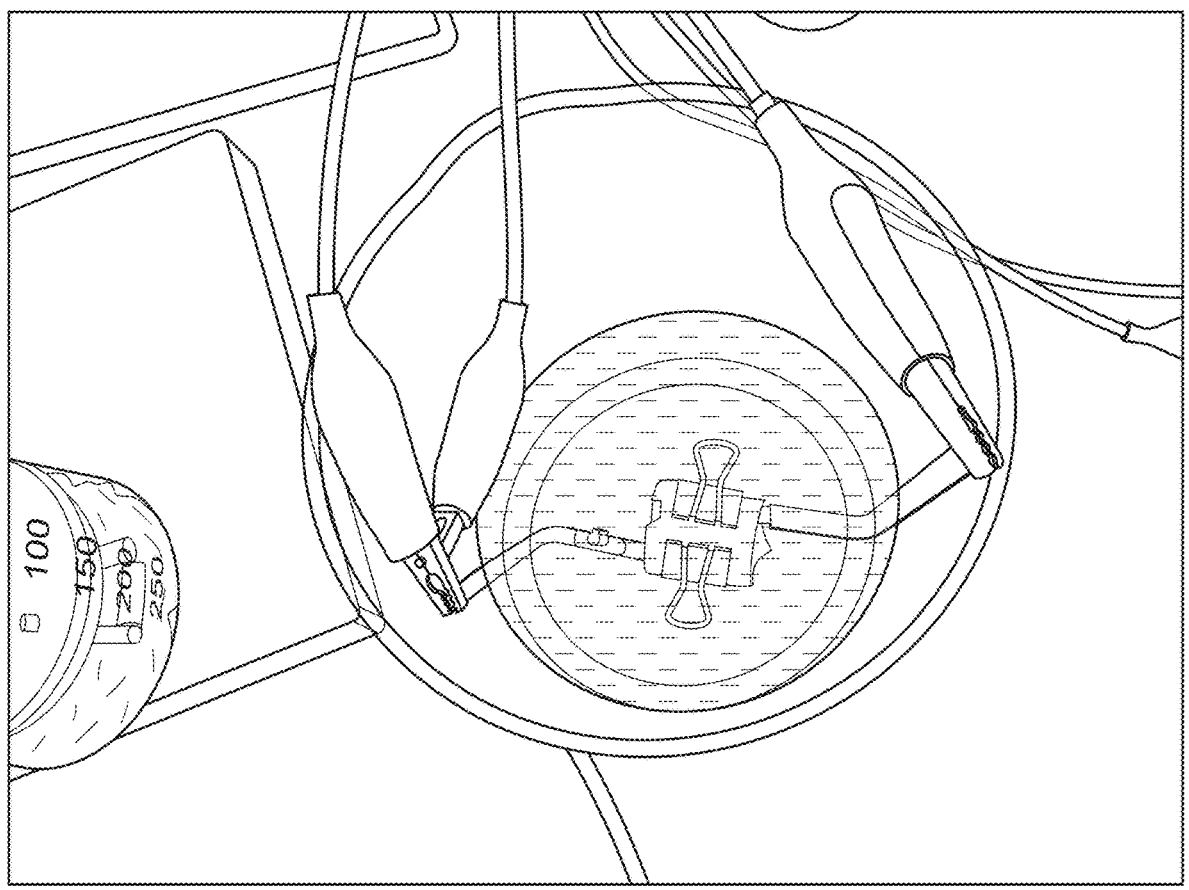
FIG. 17 shows an image of prepared composite membranes in a sandwiched structure, covered by two gold-sputtered stainless-steel plates, and submerged into 1M sulfuric acid.

As seen in FIG. 17, prepared composite membranes were made into sandwiched structure covered by two gold-sputtered stainless-steel plates and submerged into 1M sulfuric acid to be test the proton conductivity, as shown below. The measured proton conductivity at room temperature was 0.27 ($\Omega^{-1}cm^{-1}$), larger than Nafion® at even 100% hydration level.

Example 4

Figure 16:
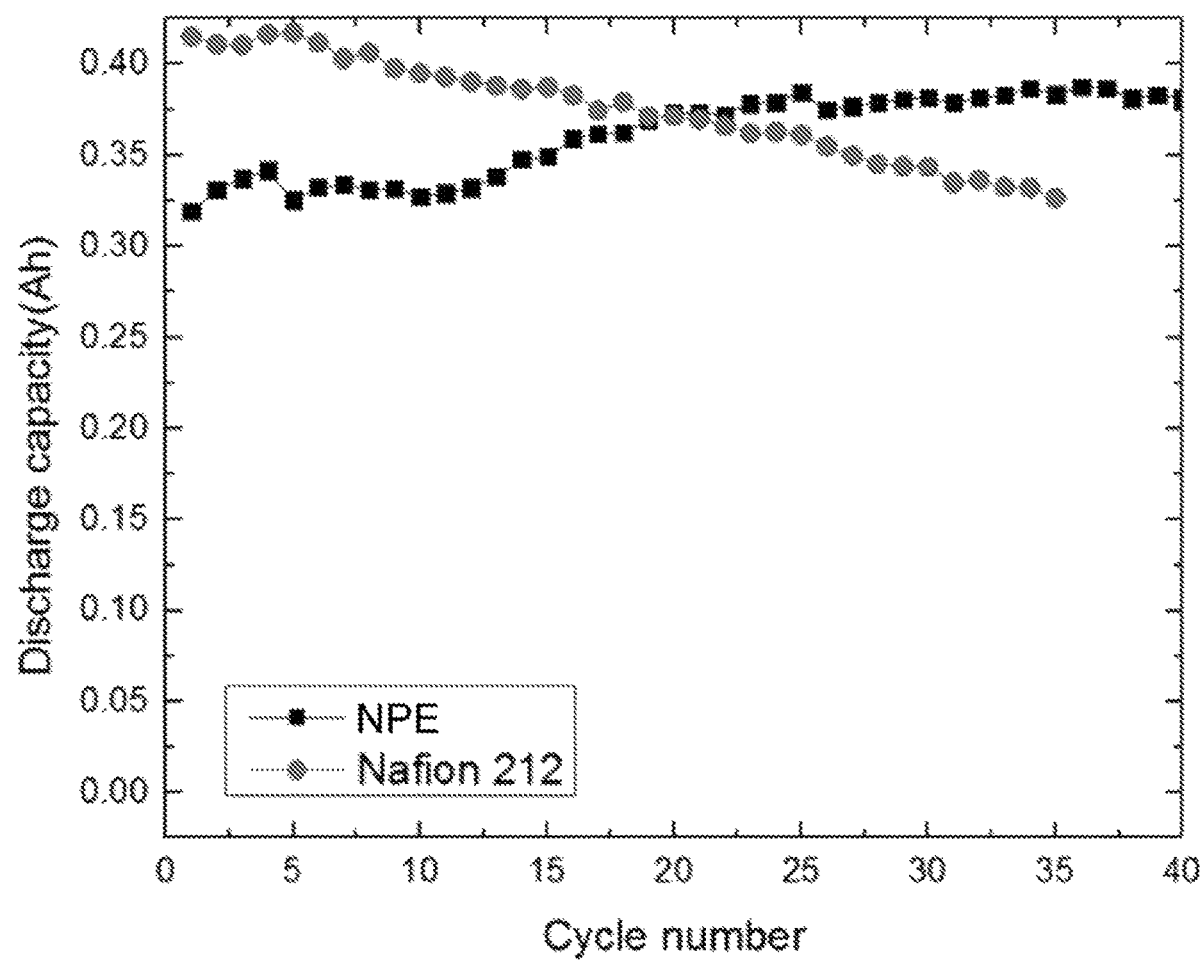
FIG. 16 shows a plot of NPE flow battery test for 40 cycles, outperformed against Nafion 212 membranes in discharge capacities.

Composite membranes were prepared and tested in Vanadium Flow Battery set-up for over 48 hours. NPE outperformed against Nafion® in discharge capacities over 40 cycles, as shown in FIG. 16.

Example 5

UHMWPE Nanoporous Membrane Preparation: UHMWPE (GUR 4022) was purchased from Celanese, and the average molecular weight was about $3.5\times106$ g $mol^{-1}$. Petrolatum (Protopet 1S) was purchased from Sonneborn®, average Mw=600 g $mol^{-1}$. 1 wt % antioxidant mixture of Irganox 1010® and Irgafos 168® (1:1 by weight) was used to stabilize the polymer during processing. Then the gel film was freely extruded by HAAKE twin screw extruder with a tape take-up unit. Then the free extruded gel films were hot stretched twice at 120° C. in two perpendicular directions in sequence on the INSTRON 5567 universal testing system fixed with an environmental chamber. All gel films were drawn sequentially to a total draw ratio of 6×6. Dimensional shrinkages were inhibited in transverse direction during hot stretching by confining the films laterally during drawing. All films were annealed at 125° C. for 15 min after stretching to relieve internal stresses and induce self-reinforced composite formation. Petrolatum, the solvent for UHMWPE, was extracted by N-hexane. Dimensional constraint was applied through all the procedures to introduce membrane porosity after oil removal. Then the highly porous biaxial oriented UHMWPE films were prepared, labeled as P (for "porous") Class. LV-SEM: Top-surfaces of membranes were examined using an FEI Quanta 250 FEG low-voltage scanning electron microscopic system. The imaging of polymeric samples without any conductive coating was performed at an acceleration voltage of 2 kV and a compensation voltage of 0.8 kV. Differential Scanning Calorimetry (DSC): Differential scanning Calorimetry was carried out on a TA Q1000DSC, ramping from 0 to 170° C. at 5° C. $min^{-1}$. To simulate the thermal history of annealing with biaxial constraint force, films were folded and loaded between flat aluminum pans, then compressed together before DSC tests. Both on-set melting point and peak melting point were reported, on-set melting point was corresponding temperature of intersect of extrapolated baseline and endothermic slope. Relative crystallinity was determined by the following equation:

$$\chi_{DSC}=(\Delta H_m/\Delta H_m^0)\times 100\% \quad (2)$$

where $\chi_{DSC}$ is relative crystallinity based on DSC results, $\Delta H_m$ is measured enthalpy of endothermic peaks, and $\Delta H_m^0$ is the heat fusion of polyethylene, 293.57 J g$^{-1}$.

ARES-2000 rheometer (TA Instruments) was used for tensile properties measurement of prepared membranes, taking ASTM D882 as standard reference.

Puncture resistance test was performed using the similar setup and the same puncture velocity of 25 mm min$^{-1}$ according to the standard ASTM F1306-16, with a 3 mm diameter stainless steel ball (a little smaller than the standard with diameter of 3.2 mm).

2025 coin cells were assembled with membranes immersed in 1 mol/L LiPF$_6$ in EC/DMC/EMC (1:1:1 vol %) electrolyte and sandwiched in between two smooth surface stainless steel electrodes. All cells were assembled in an argon filled gloved box with water and oxygen less than 0.1 ppm. Before testing the cells were conditioned for 24 h for separators to be fully saturated. AC impedance measurements were carried out using CH760E (CH Instruments) electrochemical workstation over frequency from 0.1 Hz to 100 kHz.

2025 coin cells were assembled with membranes immersed in 1 mol/L LiPF$_6$ in EC/DMC/EMC (1:1:1 vol %) electrolyte and sandwiched between LiCoO$_2$/BP2000/PVDF (8:1:1 wt %) as the cathode and Li metal as the anode. All cells were assembled in an argon-filled gloved box with water and oxygen less than 0.1 ppm. AC impedance measurements were performed using CH760E (CH Instruments) electrochemical workstation over frequency from 0.1 to 100 kHz.

Charge-discharge test was carried out for the 2025 coin cells assembled by sandwiching the membrane in between LiCoO$_2$/BP2000/PVDF (8:1:1 wt %) cathode and lithium metal anode, with 1 mol/L LiPF$_6$ in EC/DMC/EMC (1:1:1 vol %) electrolyte. All cells were assembled in an argon-filled gloved box with water and oxygen less than 0.1 ppm. The cell was charged and discharged at 1° C. and 30° C. within the range of 3.0-4.3 V for 50 cycles using Neware BTS 4000 system.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] Wang, Qingsong, et al. "Thermal runaway caused fire and explosion of lithium ion battery." Journal of power sources 208 (2012): 210-224.
[2] Balakrishnan, P. G., R. Ramesh, and T. Prem Kumar. "Safety mechanisms in lithium-Ion batteries." Journal of Power Sources 155.2 (2006): 401-414.
[3] Li, Feng, and Xugang Zhang. "Electrochemical cell having a safety device." U.S. patent application Ser. No. 13/631,220.
[4] Wang, Han-jun, and Dae-yon Moon. "BATTERY PACK." U.S. Pat. No. 20,150,364,745. 17 Dec. 2015.
[5] Zhang, Sheng Shui. "A review on the separators of liquid electrolyte Li-ion batteries." Journal of Power Sources 164.1 (2007): 351-364.
[6] Ozawa, Kazunori. "Lithium-ion rechargeable batteries with LiCoO2 and carbon electrodes: the LiCoO2/C system." Solid State Ionics 69.3-4 (1994): 212-221.
[7] Laman, F. C., M. A. Gee, and J. Denovan. "Impedance studies for separators in rechargeable lithium batteries." Journal of The Electrochemical Society 140.4 (1993): L51-L53.
[8] Ilic, D., et al. "PoLiFlex™, the innovative lithium-polymer battery." Journal of power sources 129.1 (2004): 34-37.
[9] Chang, Sung Kyun, Hong-Kyu Park, and P. A. R. K. Sinyoung. "Additive for electrochemical element to improve safety." U.S. Pat. No. 9,225,036. 29 Dec. 2015.
[10] Takeuchi, Esther S. "Thermal protection separator for alkali metal batteries." U.S. Pat. No. 6,475,666. 5 Nov. 2002.
[11] Nguyen, Khuy V., and C. Glen Wensley. "Shutdown battery separator made with a blend of polymer and oligomer." U.S. Pat. No. 6,749,961. 15 Jun. 2004.
[12] Chen, Kaimin, Craig L. Schmidt, and Paul M. Skarstad. "Implantable battery having thermal shutdown separator." U.S. Pat. No. 8,945,753. 3 Feb. 2015.
[13] K. Schmidt-Rohr, Q. Chen, Parallel cylindrical water nanochannels in Nafion fuel-cell membranes. Nature materials 7, 75-83 (2008).
[14] J. M. Brockris, S. Srinivasan, Fuel cells: their electrochemistry. (1969).
[15] P. Costamagna, S. Srinivasan, Quantum jumps in the PEMFC science and technology from the 1960s to the year 2000: Part II. Engineering, technology development and application aspects. Journal of power sources 102, 253-269 (2001).
[16] V. Arcella, A. Ghielmi, G. Tommasi, High performance perfluoropolymer films and membranes. Annals of the New York Academy of Sciences 984, 226-244 (2003).
[17] W. Y. Hsu, T. D. Gierke, Ion transport and clustering in Nafion perfluorinated membranes. Journal of Membrane Science 13, 307-326 (1983).
[18] K. Kreuer, On the development of proton conducting polymer membranes for hydrogen and methanol fuel cells. Journal of membrane science 185, 29-39 (2001).
[19] P. Choi, N. H. Jalani, R. Datta, Thermodynamics and proton transport in Nafion II. Proton diffusion mechanisms and conductivity. Journal of the electrochemical society 152, E123-E130 (2005).
[20] M. P. Rodgers, J. Berring, S. Holdcroft, Z. Shi, The effect of spatial confinement of Nafion® in porous membranes on macroscopic properties of the membrane. Journal of Membrane Science 321, 100-113 (2008).
[21] T. Gierke, G. Munn, F. Wilson, The morphology in naftion perfluorinated membrane products, as determined by wide- and small-angle x-ray studies. Journal of Polymer Science Part B: Polymer Physics 19, 1687-1704 (1981).
[22] J. Lin, P.-H. Wu, R. Wycisk, P. N. Pintauro, Z. Shi, Properties of water in prestretched recast Nafion. Macromolecules 41, 4284-4289 (2008).
[23] C. Li, G. Sun, S. Ren, J. Liu, Q. Wang, Z. Wu, H. Sun, W. Jin, Casting Nafion-sulfonated organosilica nano-composite membranes used in direct methanol fuel cells. Journal of membrane science 272, 50-57 (2006).

[24] S. C. Byun, Y. J. Jeong, J. W. Park, S. D. Kim, H. Y. Ha, W. J. Kim, Effect of solvent and crystal size on the selectivity of ZSM-5/Nafion composite membranes fabricated by solution-casting method. Solid State Ionics 177, 3233-3243 (2006).

[25] N. Miyake, J. Wainright, R. Savinell, Evaluation of a sol-gel derived Nafion/silica hybrid membrane for polymer electrolyte membrane fuel cell applications: II. Methanol uptake and methanol permeability. Journal of the Electrochemical Society 148, A905-A909 (2001).

[26] F. Bauer, S. Denneler, M. Willert-Porada, Influence of temperature and humidity on the mechanical properties of Nafion® 117 polymer electrolyte membrane. Journal of Polymer Science Part B: Polymer Physics 43, 786-795 (2005).

[27] Y. Tang, A. M. Karlsson, M. H. Santare, M. Gilbert, S. Cleghorn, W. B. Johnson, An experimental investigation of humidity and temperature effects on the mechanical properties of perfluorosulfonic acid membrane. Materials Science and Engineering: A 425, 297-304 (2006).

[28] M. Falk, An infrared study of water in perfluorosulfonate (Nafion) membranes. Canadian Journal of Chemistry 58, 1495-1501 (1980).

[29] A. Z. Weber, J. Newman, Transport in polymer-electrolyte membranes I. Physical model. Journal of the Electrochemical Society 150, A1008-A1015 (2003).

[30] A. Sahu, S. Pitchumani, P. Sridhar, A. Shukla, Nafion and modified-Nafion membranes for polymer electrolyte fuel cells: An overview. Bulletin of Materials Science 32, 285-294 (2009).

[31] W. Zhang, P.-L. Yue, P. Gao, Crystallinity enhancement of Nafion electrolyte membranes assisted by a molecular gelator. Langmuir 27, 9520-9527 (2011).

[32] W. Zhang, M. K. S. Li, P.-L. Yue, P. Gao, Exfoliated Pt-clay/Nafion nanocomposite membrane for self-humidifying polymer electrolyte fuel cells. Langmuir 24, 2663-2670 (2008).

What is claimed is:

1. A nanoporous membrane, comprising:
an ultra-high-molecular-weight polyethylene (UHMWPE),
wherein the membrane is biaxially oriented,
wherein the membrane comprises a plurality of nanofibrils of shish-kebab crystals randomly aligned in the membrane,
wherein the shish-kebab crystals each has a kebab width of about 92 nanometers (nm) and a kebab thickness of about 25 nm.
wherein the membrane excludes polyolefins other than the UHMWPE,
wherein a tensile strength of the membrane is in a range of from 200 MPa to 550 MPa,
wherein the UHMWPE has a molecular weight of at least 1 million grams per mol (g/mol),
wherein the nanoporous membrane is free from any polyethylene other than the UHMWPE having the molecular weight of at least 1 million g/mol, and
wherein the membrane has a crystallinity of about 52%, and
wherein the membrane has a bulk resistance of about 14,900 Ohms ($\Omega$).

2. A method for the preparation of a biaxially oriented nanoporous ultra-high-molecular-weight polyethylene (UHMWPE) membrane according to claim 1, the method comprising:
combining a petroleum jelly, a UHMWPE, and an antioxidant;
stirring the petroleum jelly, the UHMWPE, and the antioxidant to form a suspension;
feeding the suspension into an extruder to produce a gel film;
stretching the gel film to a desired set of dimensions;
subjecting the stretched gel film to an annealing temperature; and
extracting the petroleum jelly from the stretched gel film.

3. The method of claim 2, wherein the petroleum jelly, the ultra-high-molecular-weight polyethylene (UHMWPE), and the antioxidant are stirred at a temperature of below 150° C.

4. The method of claim 3, wherein the petroleum jelly includes petrolatum, white petrolatum, or a semi-solid mixture of hydrocarbons.

5. The method of claim 4, wherein the antioxidant includes a phenolic antioxidant or a phosphatic antioxidant.

6. The method of claim 5, wherein the suspension is homogenous.

7. The method of claim 6, wherein the extruder is a twin-screw extruder.

8. The method of claim 7, wherein a temperature gradient between the feeding zone of the extruder and the exit zone is 120° C. and 220° C.

9. The method of claim 7, wherein a temperature at an exit of the extruder is between 130°° C. and 180° C.

10. The method of claim 9, wherein the gel film extruded from the extruder is fed into the feeding zone of the extruder and passed through the extruder.

11. The method of claim 10, wherein the gel film is stretched in a controlled environment, wherein a temperature of the controlled environment is homogenous and constant.

12. The method of claim 11, wherein a percentage increase in a distance of two perpendicular gauge lengths of the gel film is 600%×600%.

13. The method of claim 11, wherein a percentage increase in a distance of two perpendicular gauge lengths of the gel film is 2,000%×2,000%.

14. The method of claim 11, wherein a gauge length of the gel film can be increased at a rate of 200%/min at a temperature of 80°° C. to 140° C.

15. The method of claim 14, wherein the stretched gel film is annealed at a temperature of 100° C. to 145° C.

16. The method of claim 11, wherein the gel film is stretched by a uniaxial stretching equipment, wherein the gel film is stretched in two perpendicular directions in sequence.

17. The method of claim 2, wherein the petroleum jelly is extracted by a solvent based extraction method, including an N-hexane extraction method at temperatures below the boiling temperature of the solvent.

18. The method of claim 2, further comprising:
dissolving a low equivalent weight perfluoro-sulfonated acid in a isopropanol solution;
inserting the low equivalent weight perfluoro-sulfonated acid-isopropanol solution into a pore on a first surface of the stretched gel film; and
subjecting the stretched gel film with the low equivalent weight perfluoro-sulfonated acid-isopropanol solution inserted into a pore on a first surface of the stretched gel film to an annealing temperature.

19. The method of claim 18, wherein the low equivalent weight perfluoro-sulfonated acid is dissolved in the isopropanol solution at a temperature of 100° C.

20. The method of claim 18, further comprising applying an isopropanol solution to a second surface, wherein the second surface is on an opposite face of the stretched gel film than the first surface.

21. The method of claim 18, wherein the stretched gel film with the low equivalent weight perfluoro-sulfonated acid-isopropanol solution inserted into a pore on a first surface of the stretched gel film is subjected to an annealing temperature of 130° C.

22. The method of claim 18, wherein the stretched gel film with the low equivalent weight perfluoro-sulfonated acid-isopropanol solution inserted into a pore on a first surface of the stretched gel film is subjected to an annealing temperature for a period of 12 hours.

23. The membrane of claim 1, wherein a thickness of the membrane is 6 µm.

24. The membrane of claim 1, wherein a tensile strength of the membrane is in a range of from 250 MPa to 550 MPa.

25. The membrane of claim 1, the membrane having been subjected to thermal annealing at a temperature of 145° C. for 7 seconds under lateral dimension constraints.

26. The membrane of claim 25, wherein a tensile strength of the membrane is in a range of from 300 MPa to 550 MPa.

27. The membrane of claim 1, wherein a pore in the nanoporous membrane has a diameter of 35 nm.

28. The membrane of claim 27, wherein a thickness of the membrane is 2 µm.

29. The membrane of claim 1, wherein a first melting peak temperature of the membrane is 132° C. and a second melting peak temperature is 150° C.

30. The membrane of claim 1, wherein the membrane has a volumetric porosity of greater than 60%.

31. The membrane of claim 1, wherein the membrane is a separator in a fuel cell, flow battery, battery, or other energy application.

32. The membrane of claim 1, wherein the UHMWPE has a molecular weight of at least 3.5 million g/mol.

33. The membrane of claim 1, wherein the shish-kebab crystals each has a shish diameter of about 30 nm.

34. The membrane of claim 1, wherein the shish-kebab crystals have an inter-kebab distance of about 60 nm.

\* \* \* \* \*